(12) United States Patent
Araki

(10) Patent No.: US 8,342,674 B2
(45) Date of Patent: Jan. 1, 2013

(54) INK COMPOSITION AND INKJET RECORDING METHOD

(75) Inventor: Kenjiro Araki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 279 days.

(21) Appl. No.: 12/889,134

(22) Filed: Sep. 23, 2010

(65) Prior Publication Data

US 2011/0074897 A1    Mar. 31, 2011

(30) Foreign Application Priority Data

Sep. 25, 2009   (JP) ................................. 2009-221171

(51) Int. Cl.
*B41J 2/01* (2006.01)
*B41J 2/195* (2006.01)
*B41J 2/14* (2006.01)
*B41M 5/20* (2006.01)

(52) U.S. Cl. ............... 347/102; 347/7; 347/52; 503/227
(58) Field of Classification Search .......................... None
See application file for complete search history.

(56) References Cited

FOREIGN PATENT DOCUMENTS

| EP | 1475743 A1 | 11/2004 |
|---|---|---|
| JP | 2003-176430 A | 6/2003 |
| JP | 2006-131884 A | 5/2006 |
| WO | 00/31030 A1 | 6/2000 |
| WO | 2008/015474 A1 | 2/2008 |
| WO | 2008/053235 A1 | 5/2008 |

OTHER PUBLICATIONS

European Search Report dated Jan. 28, 2011 on European Application No. EP 10177189.7.
E. Bellotti et al, "Use of a New Photoinitiator in Graphics Arts", Radtech Europe 2005 Conference and Exhibition, 2005.

*Primary Examiner* — Stephen Meier
*Assistant Examiner* — Alexander C Witkowski
(74) *Attorney, Agent, or Firm* — Sughrue Mion, PLLC

(57) ABSTRACT

An ink composition is provided that includes (A) a monofunctional monomer comprising an acrylate monomer represented by Formula (I) and (B) a photopolymerization initiator represented by Formula (II), the monofunctional monomer (A) having a content of 30 to 90 wt %. There is also provided an inkjet recording method that includes ($a^1$) a step of discharging onto a recording medium the ink composition according to any one of Claims 1 to 11; and ($b^1$) a step of curing the ink composition by irradiating the discharged ink composition with actinic radiation.

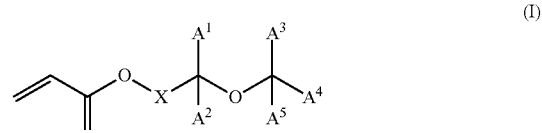

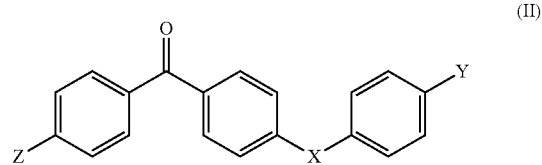

14 Claims, No Drawings

INK COMPOSITION AND INKJET RECORDING METHOD

BACKGROUND OF THE INVENTION

1. Field of the Invention

The present invention relates to an ink composition suitably used for inkjet recording and an inkjet recording method.

2. Description of the Related Art

An actinic radiation-curing composition containing a polymerizable compound cures as a result of irradiation with actinic radiation such as UV or an electron beam and polymerization of the compound, and is applicable to, for example, a thin film coating material, a printing ink, etc. Such an actinic radiation-curing composition can be applied to an inkjet recording ink composition since the curing properties, etc. are good, and particularly in recent years accompanying an increase in demand for high performance for an inkjet recording ink composition, there is a desire for one that can be suitably used in such a field and has excellent photocurability as a thin film.

Furthermore, as an actinic radiation-curing composition, those described in JP-A-2003-176430 (JP-A denotes a Japanese unexamined patent application publication) and JP-A-2006-131884 are known.

JP-A-2003-176430 describes an inkjet white ink comprising a photoreactive polyfunctional monomer, a white pigment, and a photopolymerization initiator, the inkjet white ink having a viscosity at 40° C. of no greater than 13 mPa·s.

JP-A-2006-131884 describes a radiation-curing ink composition comprising a coloring material, a monomer, and a photopolymerization initiator, the radiation-curing ink composition comprising as the monomer an acrylamide derivative, the amount of acrylamide derivative being 10 to 90 wt % of the entire ink composition, and the entire ink composition having a viscosity at 25° C. of 3 to 35 mPa·s.

BRIEF SUMMARY OF THE INVENTION

In order to photocure an actinic radiation-curing composition with a low exposure using an LED as an actinic radiation source, it is important to further increase the sensitivity of photopolymerization initiator.

Moreover, conventionally, there are few photopolymerization initiators used in actinic radiation-curing compositions that have absorption at a wavelength of 365 nm. Because of this, when UV at a wavelength of 365 nm is used for photocuring, a sensitizer is added so as to promote generation of active species for initiating photopolymerization. However, it is difficult to sufficiently improve photocurability merely by adding a sensitizer.

It is an object of the present invention to provide an ink composition that can be cured with a low exposure using as an actinic radiation source an LED, in particular a UV-LED, and that has excellent curability and flexibility, and an inkjet recording method employing the ink composition.

The above-mentioned object of the present invention has been attained by means described from <1> or <12> below. They are described below together with <2> to <11>, <13> and <14>, which are preferred embodiments.

<1> An ink composition comprising: (A) a monofunctional monomer comprising an acrylate monomer represented by Formula (I); and (B) a photopolymerization initiator represented by Formula (II), the monofunctional monomer (A) having a content of 30 to 90 wt %

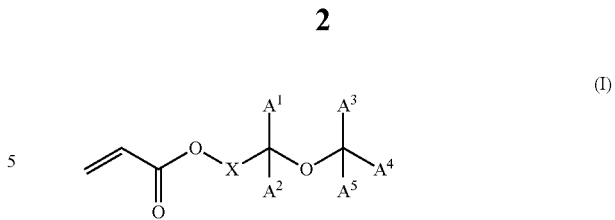

wherein $A^1$ to $A^5$ independently denote a hydrogen atom, an alkyl group, an alkoxy group, $-L^1-(OR^1)_n-R^2$, or an amino group, $L^1$ denotes a single bond or an alkylene group, $R^1$ denotes an alkylene group, $R^2$ denotes a hydrogen atom or an alkoxy group, n denotes an integer of 1 or greater, at least one of $A^1$ to $A^5$ denotes a hydrogen atom, any two of $A^1$ to $A^5$ may be bonded to each other to form a ring, and X denotes an alkylene group, a group formed by combining two or more alkylene groups and one or more ether bonds, or a group formed by combining two or more alkylene groups and one or more ester bonds,

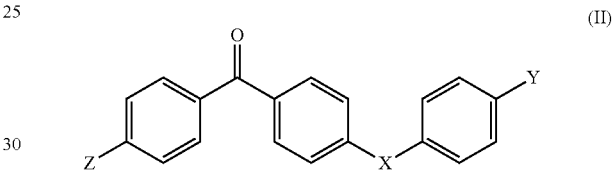

wherein X denotes $NCH_3$, an oxygen atom, or a sulfur atom, and Y and Z independently denote a hydrogen atom, a methyl group, a hydroxy group, an alkoxy group, an amino group, a thiol group, a morpholino group, a phenyl group, or an acyl group, <2> the ink composition according to <1> above, wherein the acrylate monomer represented by Formula (I) has a content of 5 to 50 wt % relative to the total weight of the ink composition, <3> the ink composition according to <1> or <2> above, wherein the acrylate monomer represented by Formula (I) is a compound represented by Formula (III)

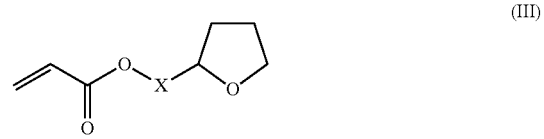

wherein X denotes an alkylene group, a group formed by combining two or more alkylene groups and one or more ether bonds, or a group formed by combining two or more alkylene groups and one or more ester bonds, <4> the ink composition according to <3> above, wherein the compound represented by Formula (III) is tetrahydrofurfuryl acrylate, <5> the ink composition according to any one of <1> to <4> above, wherein the photopolymerization initiator (B) is a compound represented by Formula (IV)

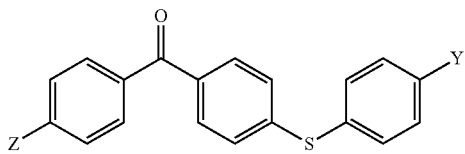

wherein Y and Z independently denote a hydrogen atom, a methyl group, a hydroxy group, an alkoxy group, an amino group, a thiol group, a morpholino group, a phenyl group, or an acyl group, <6> the ink composition according to any one of <1> to <5> above, wherein the photopolymerization initiator (B) has a content of 1 to 20 wt % relative to the total weight of the ink composition, <7> the ink composition according to any one of <1> to <6>, wherein the monofunctional monomer (A) further comprises one or more types of compounds selected from the group consisting of compounds represented by Formula (V-1) to Formula (V-3)

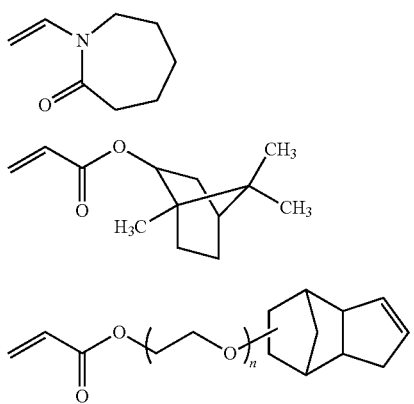

wherein n denotes an integer of 0 or greater,

<8> the ink composition according to <7> above, wherein the content of the compounds represented by Formula (V-1) to Formula (V-3) above is 5 to 85 wt % relative to the total weight of the ink composition, <9> the ink composition according to any one of <1> to <8> above, wherein it further comprises (C) a sensitizer at 1 to 5 wt % relative to the total weight of the ink composition, <10> the ink composition according to any one of <1> to <9> above, wherein it further comprises (D) an amine compound at 1 to 15 wt % relative to the total weight of the ink composition, <11> the ink composition according to any one of <1> to <10> above, wherein it comprises an acylphosphine oxide compound as a photopolymerization initiator other than the photopolymerization initiator represented by Formula (II), <12> an inkjet recording method comprising: (a¹) a step of discharging onto a recording medium the ink composition according to any one of <1> to <11>; and (b¹) a step of curing the ink composition by irradiating the discharged ink composition with actinic radiation, <13> the inkjet recording method according to <12> above, wherein the actinic radiation is UV radiated by a UV-generating light-emitting diode, <14> the inkjet recording method according to <13> above, wherein the maximum illumination intensity of the light-emitting diode on the recording medium is 10 to 2,000 mW/cm².

DETAILED DESCRIPTION OF THE INVENTION (1) Ink Composition

The ink composition of the present invention (hereinafter, also simply called an 'ink') comprises (A) a monofunctional monomer comprising an acrylate monomer represented by Formula (I); and (B) a photopolymerization initiator represented by Formula (II), the monofunctional monomer (A) having a content of 30 to 90 wt %

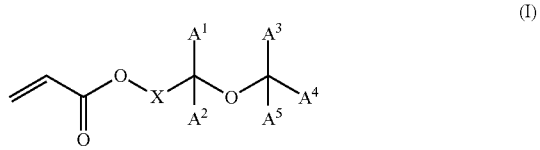

wherein $A^1$ to $A^5$ independently denote a hydrogen atom, an alkyl group, an alkoxy group, $-L^1-(OR^1)_n-R^2$, or an amino group, $L^1$ denotes a single bond or an alkylene group, $R^1$ denotes an alkylene group, $R^2$ denotes a hydrogen atom or an alkoxy group, n denotes an integer of 1 or greater, at least one of $A^1$ to $A^5$ denotes a hydrogen atom, any two of $A^1$ to $A^5$ may be bonded to each other to form a ring, and X denotes an alkylene group, a group formed by combining two or more alkylene groups and one or more ether bonds, or a group formed by combining two or more alkylene groups and one or more ester bonds,

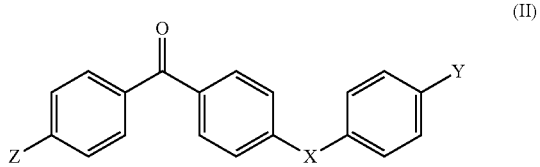

wherein X denotes $NCH_3$, an oxygen atom, or a sulfur atom, and Y and Z independently denote a hydrogen atom, a methyl group, a hydroxy group, an alkoxy group, an amino group, a thiol group, a morpholino group, a phenyl group, or an acyl group.

The ink composition of the present invention is suitably used as the inkjet recording ink composition.

The present invention is described in detail below. In the present invention, the description 'A to B' expressing a range of numerical values means 'not less than A but not more than B'. That is, it expresses a range of numerical values that includes the endpoints A and B.

The ink composition of the present invention is an ink composition that can be cured by radiation, and is an oil-based ink composition.

The 'radiation' referred to in the present invention is not particularly limited as long as it is actinic radiation that can provide energy that enables an initiating species to be generated in the ink composition when irradiated, and broadly includes α rays, γ rays, X rays, UV rays, visible light, and an electron beam; among these, UV rays and an electron beam are preferable from the viewpoint of curing sensitivity and the availability of equipment, and UV rays are particularly preferable.

As described later, the ink composition of the present invention comprises a hydrogen-abstraction type photopolymerization initiator (photopolymerization initiator represented by Formula (II)) having absorption in a wavelength region that includes 365 nm, and an acrylate monomer (acrylate monomer represented by Formula (I)) as a hydrogen source having a hydrogen atom on an atom at the α-position of an ether oxygen atom. This enables the ink composition of the present invention to be cured with a low exposure using a UV-LED as an actinic radiation source.

(A) Monofunctional Monomer

The ink composition of the present invention comprises (A) a monofunctional monomer.

The monofunctional monomer (A) comprises the acrylate monomer represented by Formula (I).

The acrylate monomer represented by Formula (I) has a hydrogen atom on an atom at the α-position of the ether oxygen atom.

$A^1$ to $A^5$ in Formula (I) above independently denote a hydrogen atom, an alkyl group, an alkoxy group, $-L^1-(OR^1)_n-R^2$, or an amino group. $L^1$ denotes a single bond or an alkylene group, $R^1$ denotes an alkylene group, $R^2$ denotes a hydrogen atom or an alkoxy group, and n denotes an integer of 1 or greater. At least one of $A^1$ to $A^5$ denotes a hydrogen atom.

The alkyl group denoted by $A^1$ to $A^5$ above is preferably an alkyl group having 1 to 8 carbon atoms, and more preferably a methyl group or an ethyl group.

The alkoxy group denoted by $A^1$ to $A^5$ above is preferably an alkoxy group having 1 to 8 carbon atoms, and more preferably a methoxy group or an ethoxy group.

The amino group denoted by $A^1$ to $A^5$ above is preferably one in which two hydrogen atoms of an amino group are replaced by alkyl groups, and is more preferably a dimethylamino group or a diethylamino group.

The alkylene group denoted by $L^1$ of $-L^1-(OR^1)_n-R^2$ above is preferably an alkylene group having 2 to 8 carbon atoms, and more preferably $—CH_2CH_2—$, $—CH(CH_3)—$, $—CH(CH_3)CH_2—$, or $—CH_2CH(CH_3)—$.

Furthermore, the alkylene group denoted by $R^1$ of $-L^1-(OR^1)_n-R^2$ above is preferably an alkylene group having 2 to 8 carbon atoms, and more preferably $—CH_2CH_2—$, $—CH(CH_3)—$, $—CH(CH_3)CH_2—$, or $—CH_2CH(CH_3)—$.

Furthermore, the alkoxy group denoted by $R^2$ of $-L^1-(OR^1)_n-R^2$ above is preferably an alkoxy group having 1 to 8 carbon atoms, and more preferably $—O—CH_3$, $—O—CH_2CH_3$, $—O—CH(CH_3)_2$, or $—O—CH_2CH(C_4H_9)CH_2CH_3$.

Furthermore, n in $-L^1-(OR^1)_n-R^2$ above is preferably an integer of 1 to 5, and more preferably 1 or 2.

In the acrylate monomer represented by Formula (I), any two of $A^1$ to $A^5$ may be bonded to each other to form a ring, and examples of such a compound forming a ring include a compound represented by Formula (III), which is described later.

X in Formula (I) above is an alkylene group, a group formed by combining two or more alkylene groups and one or more ether bonds, or a group formed by combining two or more alkylene groups and one or more ester bonds. That is, X in Formula (I) above is a group represented by Formula (X-1) or Formula (X-2) below.

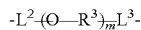
(X-1)

(In Formula (X-1), $L^2$ denotes a single bond or an alkylene group, $R^3$ denotes an alkylene group, $L^3$ denotes a single bond, an alkylene group, or an oxyalkylene group, and m denotes an integer of 0 or greater.)

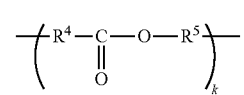
(X-2)

(In Formula (X-2), $R^4$ and $R^5$ independently denote a single bond or an alkylene group, and k denotes an integer of 1 or greater.)

The alkylene group denoted by $L^2$ of Formula (X-1) above is preferably an alkylene group having 2 to 8 carbon atoms, and more preferably $—CH_2CH_2—$, $—CH(CH_3)—$, $—CH(CH_3)CH_2—$, or $—CH_2CH(CH_3)—$.

Furthermore, the alkylene group denoted by $R^3$ in Formula (X-1) above is preferably an alkylene group having 2 to 8 carbon atoms, and more preferably $—CH_2CH_2—$, $—CH(CH_3)—$, $—CH(CH_3)CH_2—$, or $—CH_2CH(CH_3)—$.

Moreover, m in Formula (X-1) above is preferably 0 to 5, and more preferably 1 or 2.

Furthermore, the alkylene group denoted by $R^4$ in Formula (X-2) above is preferably an alkylene group having 1 to 8 carbon atoms, and more preferably $—CH_2—$, $—CH_2CH_2—$, $—CH(CH_3)—$, $—CH(CH_3)CH_2—$, or $—CH_2CH(CH_3)—$.

Moreover, the alkylene group denoted by $R^5$ in Formula (X-2) above is preferably an alkylene group having 1 to 8 carbon atoms, and more preferably $—CH_2—$, $—CH_2CH_2—$, $—CH(CH_3)—$, $—CH(CH_3)CH_2—$, or $—CH_2CH(CH_3)—$.

Furthermore, k in Formula (X-2) above is preferably 1 or greater, and more preferably 1 or 2.

The content of the monofunctional monomer (A) in the ink composition of the present invention is 30 to 90 wt % relative to the total weight of the ink composition, preferably 32.5 to 85 wt %, and more preferably 35 to 80 wt %.

The acrylate monomer represented by Formula (I) is preferably a compound represented by Formula (III) below.

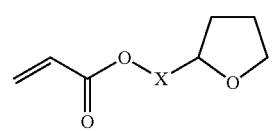
(III)

(In Formula (III), X denotes an alkylene group, a group formed by combining two or more alkylene groups and one or more ether bonds, or a group formed by combining two or more alkylene groups and one or more ester bonds.)

X in Formula (III) has the same meaning as X in Formula (I) above, and details thereof and a preferred range are also the same.

Specific examples of the compound represented by Formula (III) include tetrahydrofurfuryl acrylate (THFA) (X═—CH_2—).

Specific preferred examples of the acrylate monomer represented by Formula (I) include M-1 to M-20, which are shown below. Among the specific examples shown below, M-13, M-15, M-17, and M-19 are also specific examples of the compound represented by Formula (III).

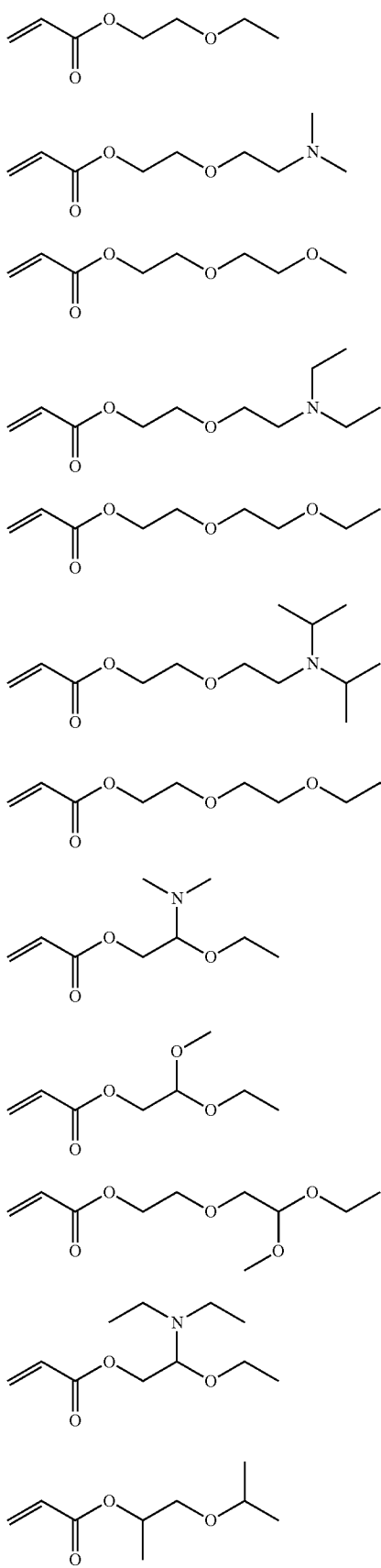
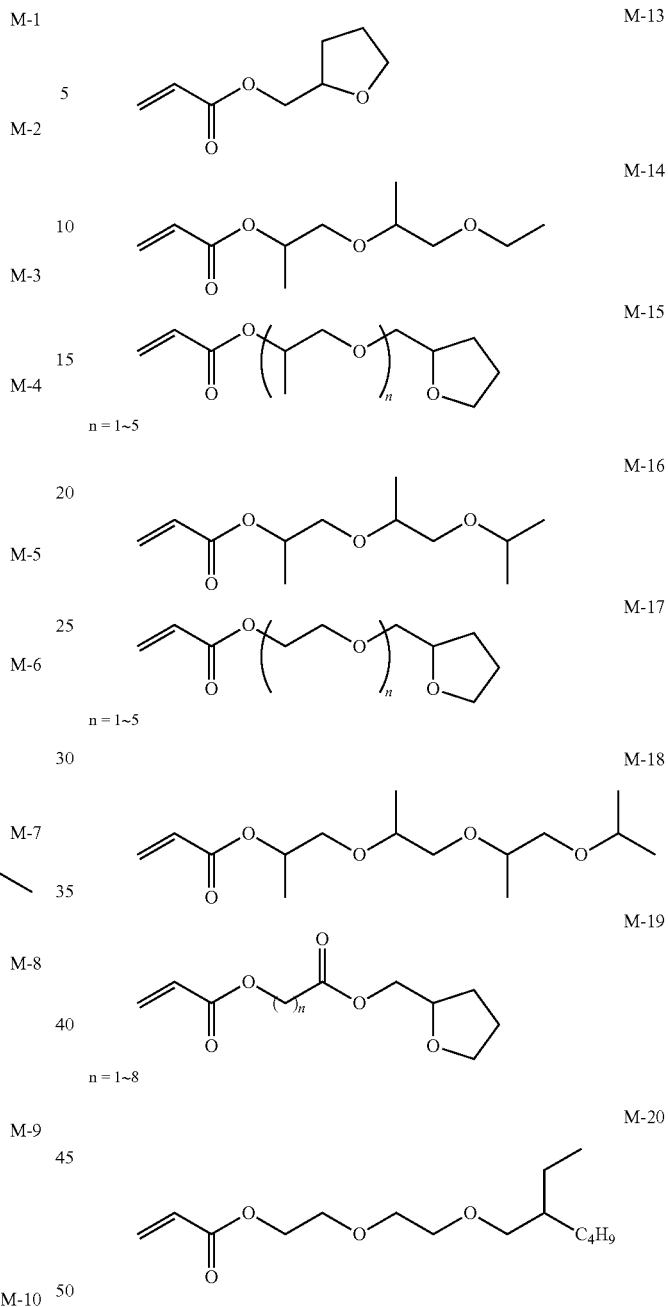

The acrylate monomers represented by Formula (I), illustrated in M-1 to M-20, are widely commercially available, and examples thereof include EOEOEA (M-5, Aldrich), THFA (M-13, Tokyo Chemical Industry Co., Ltd.), CD611 (M-15, Sartomer), TC-110S (M-19, Nippon Kayaku Co., Ltd.), and Aronix M-120 (M-20, Toagosei Co., Ltd.).

The content of the acrylate monomer represented by Formula (I) in the ink composition of the present invention is preferably 5 to 50 wt % relative to the total weight of the ink composition, more preferably 7 to 45 wt %, and yet more preferably 10 to 40 wt %.

The monofunctional monomer (A) may further comprise, other than the acrylate monomer represented by Formula (I), one or more types of compounds selected from the group consisting of compounds represented by Formula (V-1) to Formula (V-3) below.

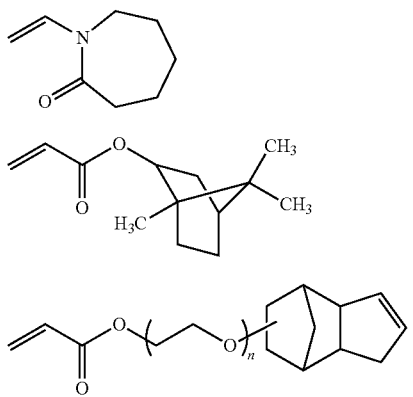

(In Formula (V-3), n denotes an integer of 0 or greater.)

The compounds represented by Formula (V-1) to Formula (V-3) above are widely commercially available, and examples thereof include NVC (Aldrich), IBOA (Tokyo Chemical Industry Co., Ltd.), and FA-512A (Hitachi Chemical Co., Ltd.), which are shown below.

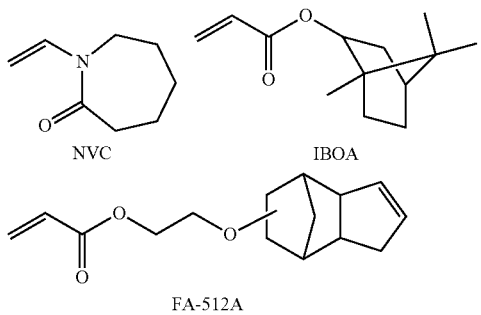

The content of the compounds represented by Formula (V-1) to Formula (V-3) above is preferably 5 to 85 wt % relative to the total weight of the ink composition, more preferably 7.5 to 80 wt %, and yet more preferably 10 to 75 wt %.

(B) Photopolymerization Initiator

The ink composition of the present invention comprises the photopolymerization initiator (B) represented by Formula (II).

The photopolymerization initiator (B) represented by Formula (II) is a p-substituted benzophenone.

X in Formula (II) above denotes $NCH_3$, an oxygen atom, or a sulfur atom.

Y and Z in Formula (II) above independently denote a hydrogen atom, a methyl group, a hydroxy group, an alkoxy group, an amino group, a thiol group, a morpholino group, a phenyl group, or an acyl group. As the alkoxy group, a methoxy group can preferably be cited. As the amino group, a dimethylamino group can preferably be cited. As the acyl group, a 2-(4'-methylbenzenesulfonyl)-2-methylpropionyl group and a 2-(4'-methylbenzenesulfonyl)-2-phenylpropionyl group can preferably be cited.

The content of the photopolymerization initiator (B) represented by Formula (II) in the ink composition of the present invention is preferably 1 to 20 wt % relative to the total weight of the ink composition, more preferably 1.2 to 15 wt %, and yet more preferably 1.5 to 10 wt %.

The photopolymerization initiator (B) represented by Formula (II) is preferably a compound represented by Formula (IV) below.

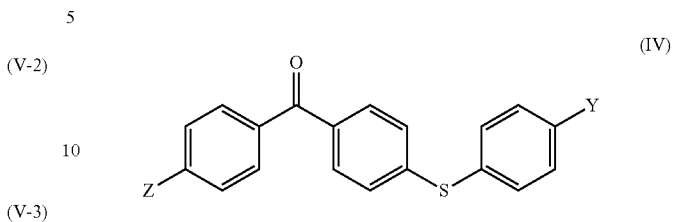

(In Formula (IV), Y and Z independently denote a hydrogen atom, a methyl group, a hydroxy group, an alkoxy group, an amino group, a thiol group, a morpholino group, a phenyl group, or an acyl group.)

Y and Z in Formula (IV) have the same meaning as Y and Z respectively in Formula (II) above, and details thereof and preferred ranges are also the same.

Specific examples of the photopolymerization initiator (B) represented by Formula (II) include A-1 to A-32, B-1 to B-32, and C-1 to C-32, which are shown below.

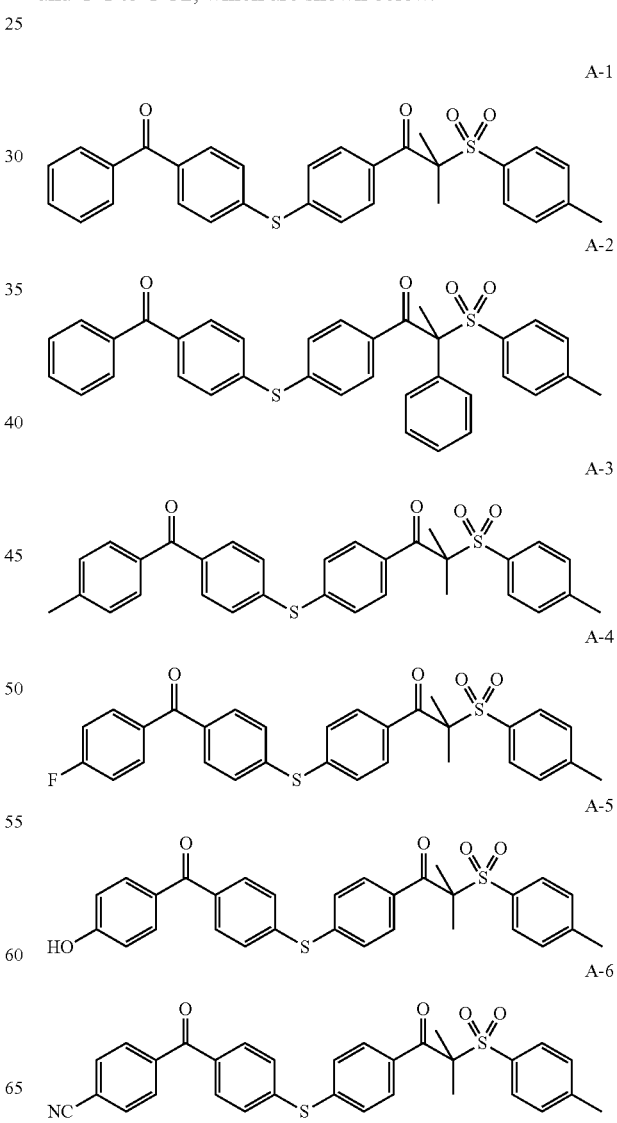

A-7
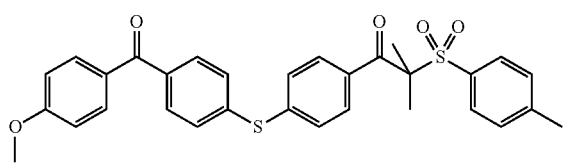
A-8
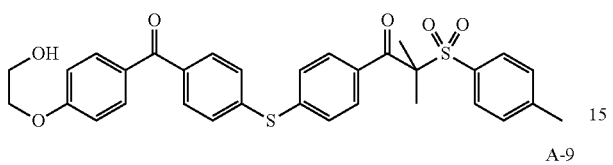
A-9
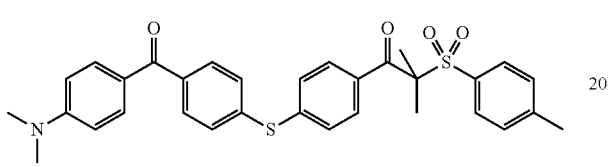
A-10
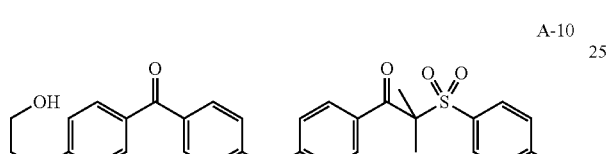
A-11
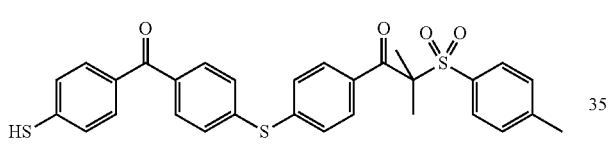
A-12
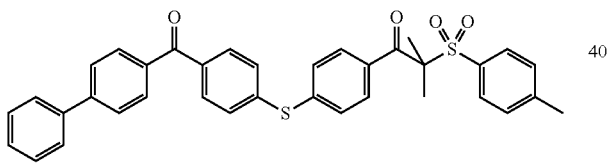
A-13
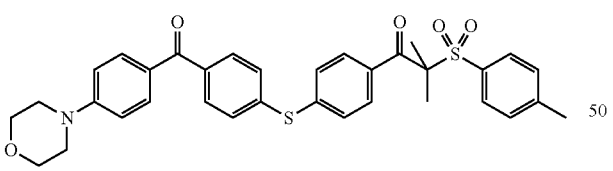
A-14
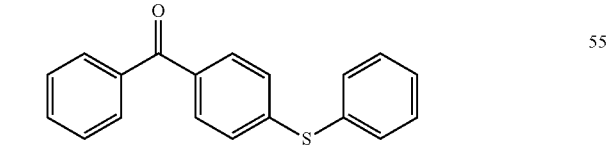
A-15
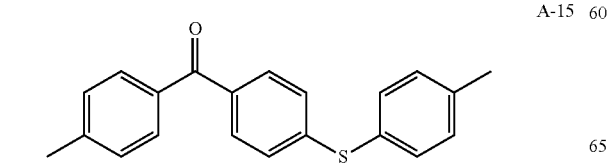
A-16
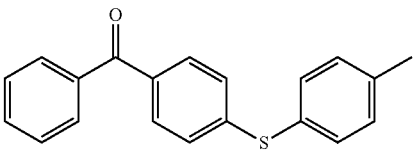
A-17
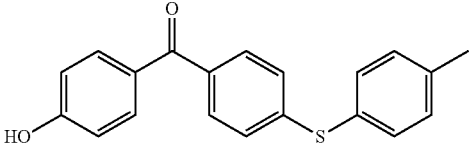
A-18
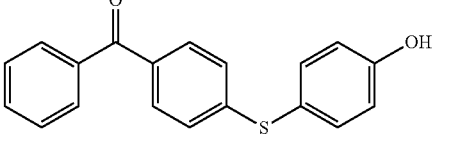
A-19
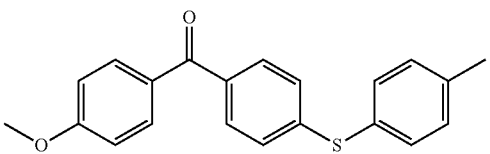
A-20
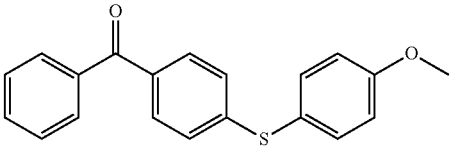
A-21
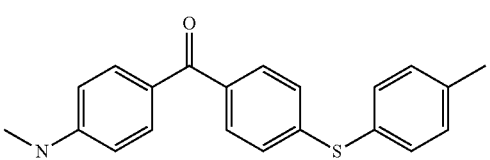
A-22
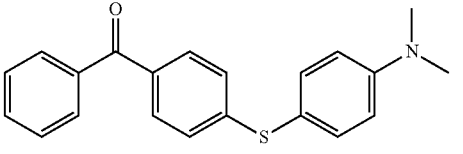
A-23
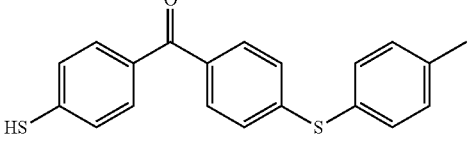
A-24
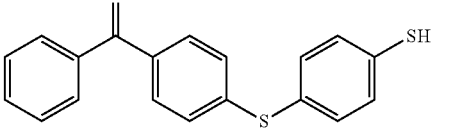

-continued

A-25, A-26, A-27, A-28, A-29, A-30, A-31

-continued

A-32, B-1, B-2, B-3, B-4, B-5, B-6, B-7, B-8

-continued

B-27
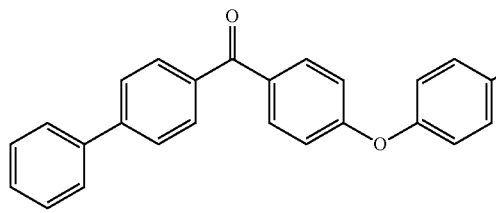
B-28
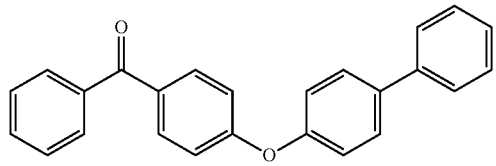
B-29
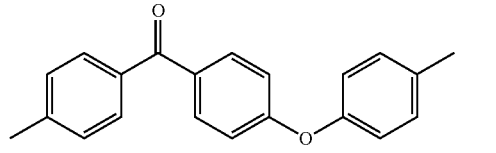
B-30
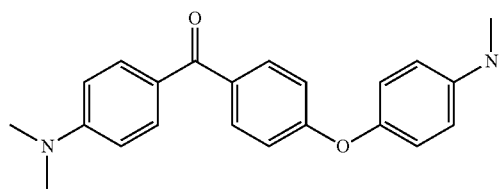
B-31
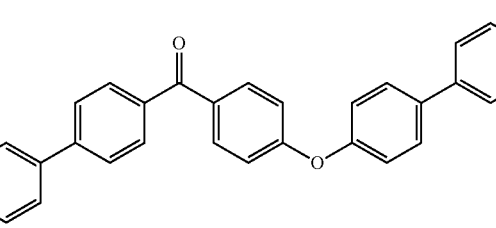
B-32
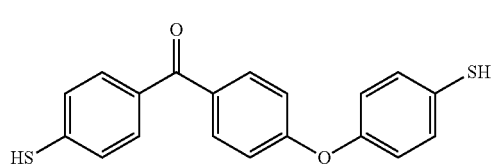
C-1
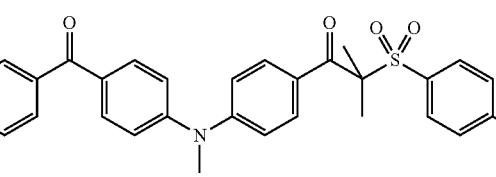
C-2
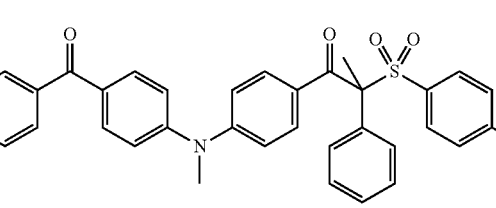
C-3
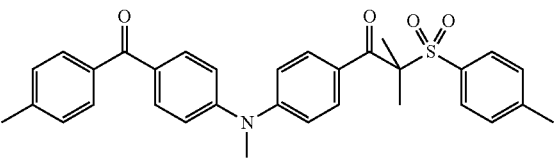
C-4
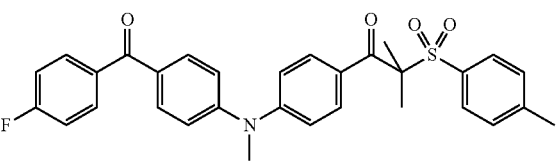
C-5
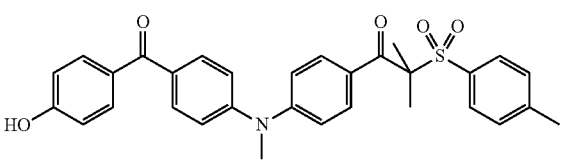
C-6
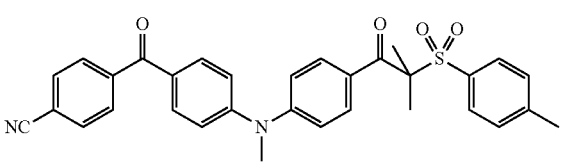
C-7
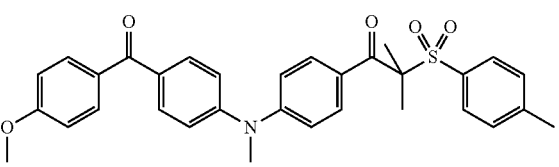
C-8
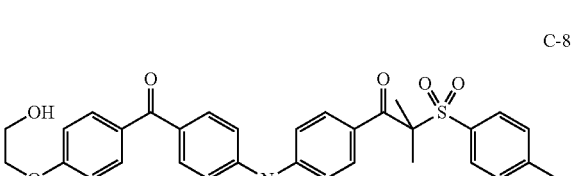
C-9
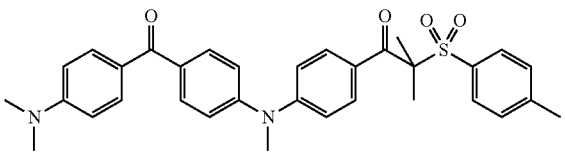
C-10
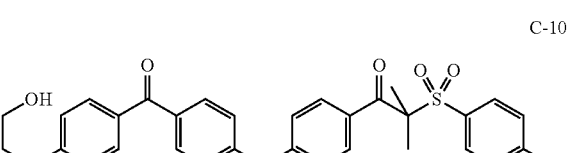

C-11
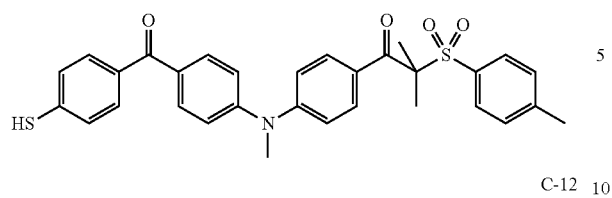
C-12
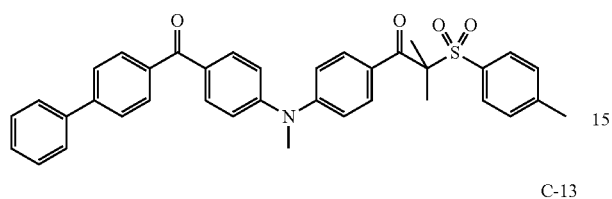
C-13
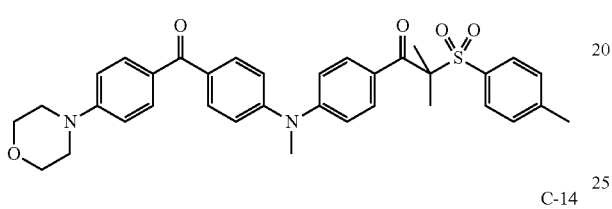
C-14
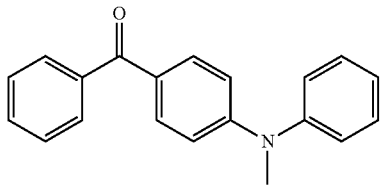
C-15
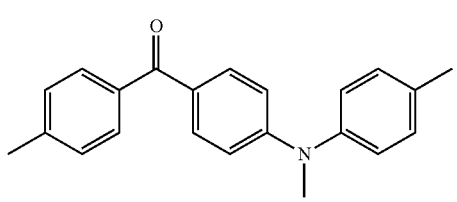
C-16
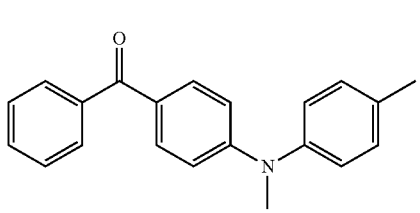
C-17
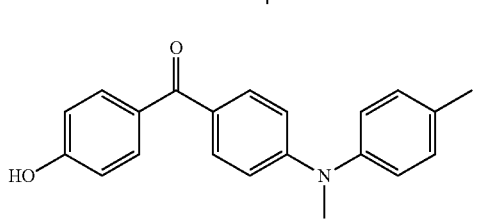
C-18
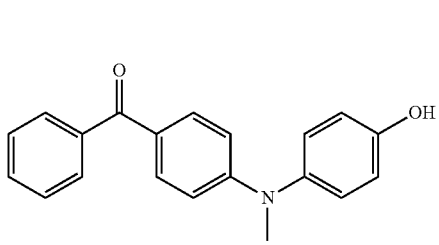
C-19
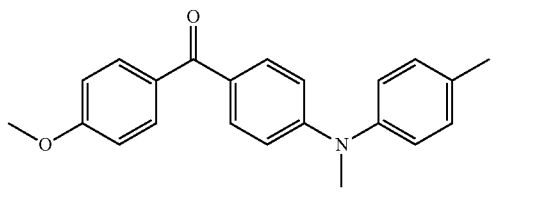
C-20
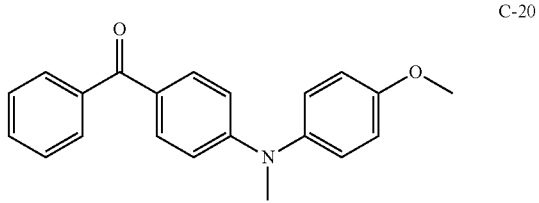
C-21
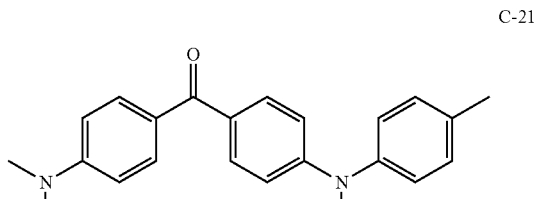
C-22
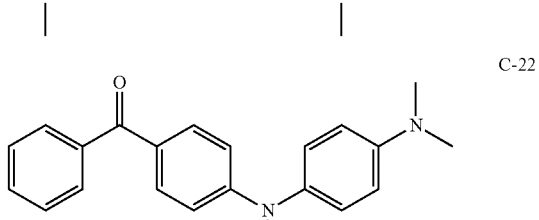
C-23
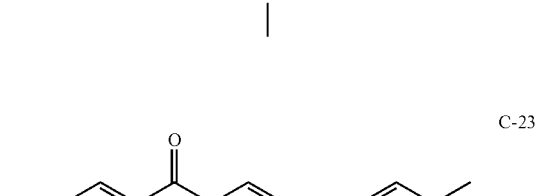
C-24
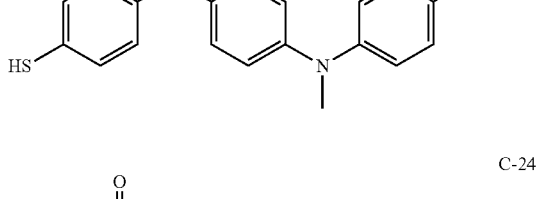
C-25
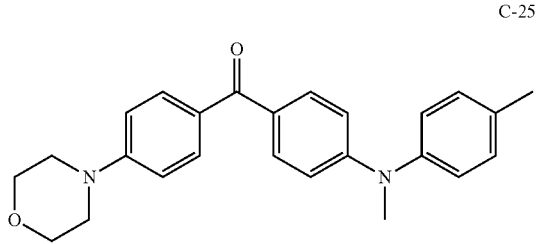

-continued

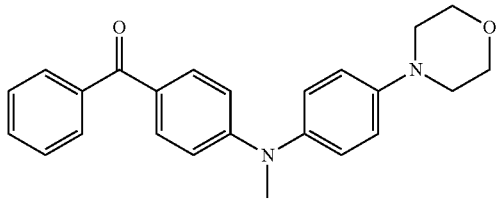
C-26

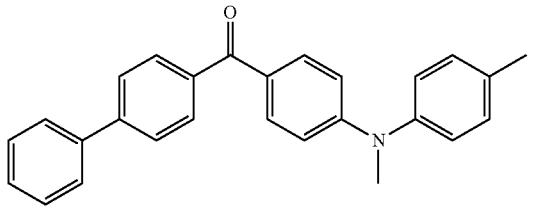
C-27

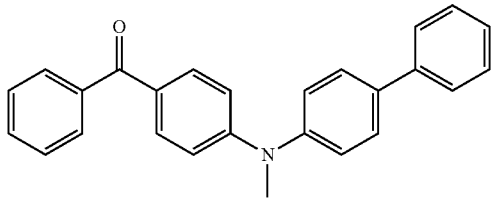
C-28

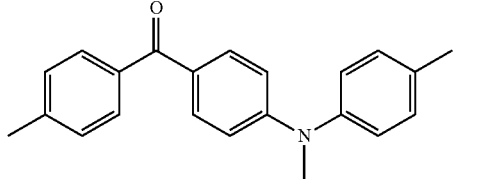
C-29

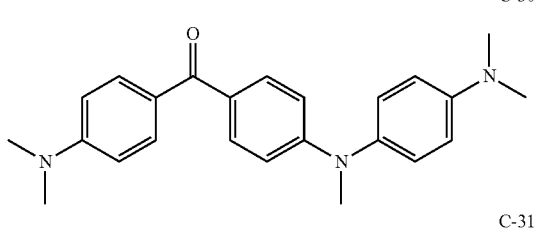
C-30

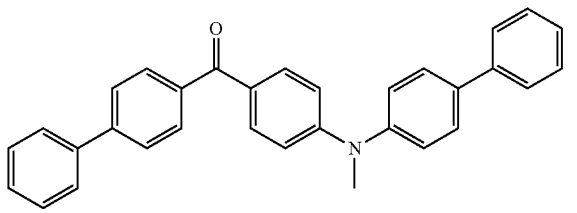
C-31

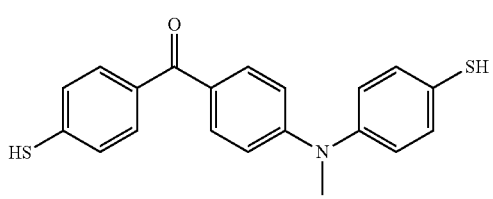
C-32

The photopolymerization initiators (B) represented by Formula (II), illustrated in A-1 to A-32, B-1 to B-32, and C-1 to C-32, are widely commercially available, and examples thereof include Esacure 1001M (A-1, Lamberti) and BMS (A-16, Nippon Kayaku Co., Ltd.).

(C) Sensitizer

The ink composition of the present invention preferably comprises (C) a sensitizer.

The sensitizer that can be used in the present invention is not particularly limited, and examples thereof include a thioxanthone compound. As the thioxanthone compound, FIRSTCURE ITX (Shell Chemicals) and DETX (Nippon Kayaku Co., Ltd.), which are shown below, can preferably be cited.

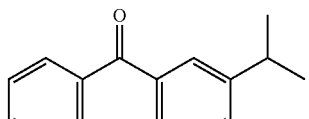
FIRSTCURE ITX

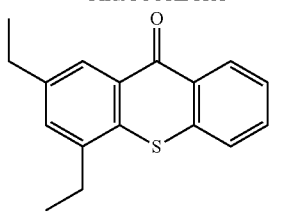
DETX

The content of the sensitizer in the ink composition of the present invention is preferably 1 to 5 wt % relative to the total weight of the ink composition, and more preferably 1.5 to 3 wt %.

(D) Amine Compound

The ink composition of the present invention preferably comprises (D) an amine compound.

The amine compound that can be used in the present invention is not particularly limited as long as it is a conventionally known amine compound.

Furthermore, the amine compound that can be used in the present invention may be any one of primary, secondary, and tertiary amine compounds, and from the viewpoint of suppression of a side reaction with a polymerizable compound and a coloration reaction, it is preferable to use a tertiary amine compound.

Preferred examples of the amine compound include triethanolamine, N-methyl-diethanolamine, ethyl p-dimethylaminobenzoate, Michler's ketone, and corresponding derivatives. A known amide or another amine derivative may also be used.

As the amine compound, an amine-modified acrylate compound can preferably be cited.

Preferred examples of the amine-modified acrylate compound include acrylates modified by a reaction with a primary or secondary amine that are described in U.S. Pat. No. 3,844,916, EP280222, U.S. Pat. No. 5,482,649, or U.S. Pat. No. 5,734,002.

Furthermore, the amine-modified acrylate compounds are widely commercially available, and examples of aminoacrylates include EBECRYL 80, EBECRYL 81, EBECRYL 83, and EBECRYL 7100 (all from UCB Chemicals), LAROMER PO 83F, LAROMER PO 84F, and LAROMER PO 94F (all from BASF), PHOTOMER 4775 F and PHOTOMER 4967 F (both from Cognis), and CN501, CN503, CN550, CN383, CN384, and CN371 (all from Cray Valley).

The content of the amine compound in the ink composition of the present invention is preferably 1 to 15 wt % relative to the total amount of the ink composition, more preferably 5 to 10 wt %.

(E) Other Polymerizable Compound

The ink composition of the present invention preferably comprises another polymerizable compound other than the monofunctional monomer (A).

As the other polymerizable compound, a radically polymerizable compound can preferably be cited.

As the radically polymerizable compound, a photocuring material is known that employs a photopolymerizable composition described in, for example, JP-A-7-159983, JP-B-7-31399, JP-A-8-224982, JP-A-10-863, etc. (JP-B denotes a Japanese examined patent application publication).

The radically polymerizable compound is a compound having a radically polymerizable ethylenically unsaturated bond, and may be any compound as long as it has at least one radically polymerizable ethylenically unsaturated bond in the molecule; examples thereof include those having a chemical configuration such as a monomer, an oligomer, or a polymer, and a monomer and an oligomer are preferable. One type of radically polymerizable compound may be used, or two or more types thereof may be used in combination at any ratio in order to improve an intended property.

Examples of the polymerizable compound having a radically polymerizable ethylenically unsaturated bond include unsaturated carboxylic acids such as acrylic acid, methacrylic acid, itaconic acid, crotonoic acid, isocrotonoic acid, and maleic acid, and esters and salts thereof, anhydrides having an ethylenically unsaturated bond, acrylonitrile, styrene, and various types of unsaturated polyesters, unsaturated polyethers, unsaturated polyamides, unsaturated urethanes, (meth)acryl type monomer or prepolymer and (meth)acrylate esters of epoxy type monomer or prepolymer, urethane type monomer or prepolymer.

Specific examples thereof include 4-hydroxybutyl acrylate, (poly)ethylene glycol mono(meth)acrylate, (poly)ethylene glycol(meth)acrylate methyl ester, (poly)ethylene glycol (meth)acrylate ethyl ester, (poly)ethylene glycol(meth) acrylate phenyl ester, (poly)propylene glycol mono(meth) acrylate, (poly)propylene glycol mono(meth)acrylate phenyl ester, (poly)propylene glycol(meth)acrylate methyl ester, (poly)propylene glycol(meth)acrylate ethyl ester, (poly)propylene glycol diglycidyl ether acrylic acid adduct, neopentyl glycol di(meth)acrylate, (poly)ethylene glycol di(meth)acrylate, (poly)tetramethylene glycol di(meth)acrylate, bisphenol A PO (propylene oxide) adduct di(meth)acrylate, ethoxylated neopentyl glycol diacrylate, propoxylated neopentyl glycol diacrylate, bisphenol A EO (ethylene oxide) adduct di(meth) acrylate, EO-modified pentaerythritol tri(meth)acrylate, PO-modified pentaerythritol tri(meth)acrylate, EO-modified pentaerythritol tetra(meth)acrylate, PO-modified pentaerythritol tetra(meth)acrylate, EO-modified dipentaerythritol tetra (meth)acrylate, PO-modified dipentaerythritol tetra(meth) acrylate, EO-modified trimethylolpropane tri(meth)acrylate, PO-modified trimethylolpropane tri(meth)acrylate, EO-modified tetramethylolmethane tetra(meth)acrylate, and PO-modified tetramethylolmethane tetra(meth)acrylate, acrylic acid derivatives such as 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, isostearyl acrylate, 2-hydroxyethyl acrylate, butoxyethyl acrylate, benzyl acrylate, pentaerythritol triacrylate, pentaerythritol tetraacrylate, dipentaerythritol tetraacrylate, trimethylolpropane triacrylate, oligoester acrylate, isoamyl acrylate, N-methylol acrylamide, diacetone acrylamide, epoxy acrylate, methacrylic acid derivatives such as methylmethacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, allylmethacrylate, glycidyl methacrylate, benzyl methacrylate, dimethylaminomethyl methacrylate, trimethylolethane trimethacrylate, and 2,2-bis(4-methacryloxypolyethoxyphenyl)propane, and allyl compound derivatives such as allyl glycidyl eter, diallyl phthalate and triallyltrimellitate. Other specific examples thereof include 1,6-hexanediol diacrylate, 1,9-nonanediol diacrylate, 1,10-decanediol diacrylate, 2-ethylhexyl-diglycol acrylate, 2-hydroxy-3-phenoxypropyl acrylate, 2-hydroxybutyl acrylate, neopentylglycol diacrylate hydroxypivalate, 2-acryloyloxyethylphthalic acid, EO-modified nonylphenol acrylate, methoxy-polyethyleneglycol acrylate, 2-acryloyloxyethyl-2-hydroxyethylphthalic acid, dimethyloltricyclodecane diacrylate, ethoxylated phenylacrylate, 2-acryloyloxyethylsuccinic acid, modified glycerol triacrylate, bisphenol A diglycigyl ether acrylic acid adduct, modified bisphenol A diacrylate, phenoxy-polyethylene glycol acrylate, 2-acryloyloxyethylhexahydrophthalic acid, dipentaerythritol hexaacrylate, tolylenediisocyanate urethane prepolymer, lactone modified flexible acrylate, butoxyethyl acrylate, hexamethylenediisocyanate urethane prepolymer, 2-hydroxyethyl acrylate, methoxydipropylene grycol acrylate, ditrimetylolpropane tetraacrylate, and hexametylenediisocyanate urethane prepolymer, etc. More specifically, commercial products, radically polymerizable or crosslinking monomers, oligomers, and polymers known in the art such as those described in 'Kakyozai Handobukku' (Crosslinking Agent Handbook), Ed. S. Yamashita (Taiseisha, 1981); 'UV•EB Koka Handobukku (genryo-hen)' (UV•EB Curing Handbook (Starting Materials)) Ed. K. Kato (Kobunshi Kankoukai, 1985); 'UV•EB Koka Gijutsu no Oyo to Shijyo' (Application and Market of UV•EB Curing Technology), p. 79, Ed. Rad Tech (CMC, 1989); and E. Takiyama 'Poriesuteru Jushi Handobukku' (Polyester Resin Handbook), (The Nikkan Kogyo Shimbun Ltd., 1988) may be used.

These (meth)acrylate compounds are preferable since the viscosity can be decreased compared with polymerizable compounds conventionally used in a UV-curing ink, stable discharge properties can be obtained, and polymerization sensitivity and adhesion to a recording medium are also good.

A vinyl ether compound is preferably used as the radically polymerizable compound, and can be classified broadly into monovinyl ether compounds and a di- or trivinyl ether compound. Examples of vinyl ether compounds that are suitably used include di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; and monovinyl ether compounds such as ethylene glycol monovinyl ether, triethylene glycol monovinyl ether, hydroxyethyl monovinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, hydroxyl nonyl monovinyl ether, cyclohexanedimethanol monovinyl ether, n-propyl vinyl ether, isopropyl vinyl ether, isopropenyl vinyl ether, isopropenyl vinyl ether, dodecyl vinyl ether, and diethylene glycol monovinyl ether.

The vinyl ether compounds may be used singly or in a combination of two or more types as appropriate.

In the present invention, an oligomer or a polymer may be used in combination. The oligomer referred to here means a compound having a molecular weight (weight-average molecular weight for one having a molecular weight distribution) of at least 2,000, and the polymer means a compound having a molecular weight (weight-average molecular weight for one having a molecular weight distribution) of at least 10,000. The oligomer and polymer need not have a radically polymerizable group, but preferably have one. It is preferable for the number of radically polymerizable groups per molecule possessed by the oligomer or polymer to be at least 1 but no greater than 4 on average since an ink composition having excellent flexibility is obtained. The oligomer or polymer may be added in an amount appropriate for adjusting the viscosity of the ink so that it is most suitable for discharging.

Among them, the other polymerizable compound is preferably a monomer having an aromatic ring, and more preferably phenoxyethyl acrylate.

In the ink composition of the present invention, it is preferable either for the other polymerizable compound not to be contained or for it to be contained at 0 to 40 wt % relative to the total weight of the ink composition.

(F) Other Photopolymerization Initiator

The ink composition of the present invention preferably comprises a photopolymerization initiator other than the photopolymerization initiator (B) represented by Formula (II).

It is preferable to use as the other photopolymerization initiator a phosphine oxide-based photopolymerization initiator. As the phosphine oxide-based photopolymerization initiator, an acylphosphine oxide compound can preferably be cited. Use of an acylphosphine oxide compound enables an ink composition giving a cured film having excellent antiblocking properties and scratch resistance to be obtained.

When an acylphosphine oxide compound is used, it is preferably used at 1 to 8 wt % of the entire ink composition, more preferably 1 to 7 wt %, and yet more preferably 1 to 6 wt %.

As the acylphosphine oxide compound, a monoacylphosphine oxide compound, a bisacylphosphine oxide compound, etc. may be used, and use of at least a bisacylphosphine oxide is more preferable. When a bisacylphosphine is used, it is preferably used at 0.5 to 4.5 wt % of the entire ink composition, and more preferably 1 to 4 wt %.

Examples of the acylphosphine oxide compound include a compound having a partial structure represented by Formula (3) or (4) in the compound structure, which corresponds to a monoacylphosphine oxide compound or a bisacylphosphine oxide compound, respectively.

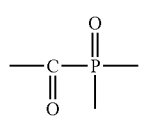

(3)

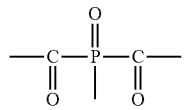

(4)

The acylphosphine oxide compound is particularly preferably one having a chemical structure represented by Formula (5) or (6).

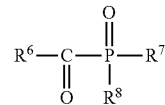

(5)

(In the formula, $R^6$, $R^7$, and $R^8$ denote an aromatic hydrocarbon group, which may have a methyl group or an ethyl group as a substituent.)

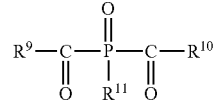

(6)

(In the formula, $R^9$, $R^{10}$, and $R^{11}$ denote an aromatic hydrocarbon group, which may have a methyl group or an ethyl group as a substituent.)

As the acylphosphine oxide compound, a monoacylphosphine oxide compound, a bisacylphosphine oxide compound, etc. may be used, and a bisacylphosphine oxide compound is preferably used. As the monoacylphosphine oxide compound, a known monoacylphosphine oxide compound may be used. Examples thereof include monoacylphosphine oxide compounds described in JP-B-60-8047 and JP-B-63-40799. Specific examples thereof include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-tolylphenylphosphinate, methyl o-tolylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-tolyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoyl-bis-diphenylphosphine oxide, pivaloyldiphenylphosphine oxide, p-tolyldiphenylphosphine oxide, 4-(t-butyl)benzoyldiphenylphosphine oxide, terephthaloyl-bis-diphenylphosphine oxide, 2-methylbenzoyldiphenylphosphine oxide, versatoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound, a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis (2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphineoxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among them, preferred examples of the acylphosphine oxide compound in the present invention include 2,4,6-trimethylbenzoyldiphenylphosphine oxide (DAROCUR TPO: manufactured by Ciba Specialty Chemicals) and bis(2,4,6-trimethylbenzoyl)phenylphosphine oxide (IRGACURE 819: manufactured by Ciba Specialty Chemicals).

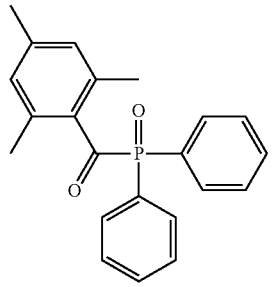

DAROCUR TPO

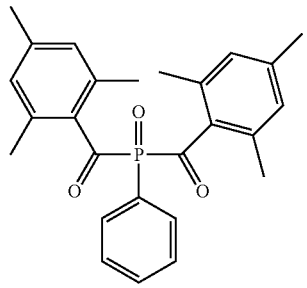

IRGACURE 819

Furthermore, in the present invention, as the other photopolymerization initiator, other than the phosphine oxide-based photopolymerization initiator, 2-methyl-1-(4-methylthiophenyl)-2-morpholinopropan-1-one (IRGACURE 907: Ciba Specialty Chemicals) and 2-hydroxy-1-{4-[4-(2-hydroxy-2-methyl-propionyl)-benzyl]phenyl}-2-methylpropan-1-one (IRGACURE 127: Ciba Specialty Chemicals), which are shown below, can be cited.

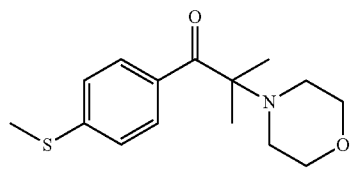

IRGACURE 907

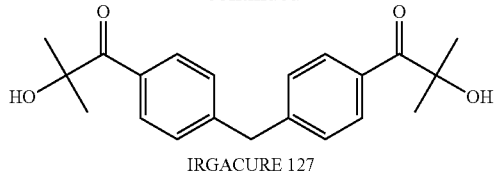

IRGACURE 127

The content of the other photopolymerization initiator described above in the ink composition of the present invention is preferably 0.5 to 18 wt % relative to the total weight of the ink composition, more preferably 1 to 15 wt %, and yet more preferably 2 to 12 wt %.

(G) Colorant

The ink composition of the present invention preferably comprises a colorant.

The colorant that can be used in the present invention is not particularly limited, and may be freely selected from known colorants such as pigments, oil-soluble dyes, aqueous dyes, and disperse dyes. Among them, in terms of excellent weatherability and color reproduction the colorant is preferably a pigment and/or an oil-soluble dye, and more preferably a pigment.

With regard to the colorant that can suitably be used in the ink composition of the present invention, from the viewpoint of preventing the sensitivity of the curing reaction by actinic radiation from being degraded it is preferable to select a compound that does not function as a polymerization inhibitor in a polymerization reaction, which is a curing reaction.

Pigment

The pigment is not particularly limited and may be selected appropriately according to an intended application; examples thereof include known organic and inorganic pigments, resin particles dyed with a dye, a commercial pigment dispersion, and a surface-treated pigment (e.g. one obtained by dispersing a pigment in water, a liquid organic compound, an insoluble resin, etc. as a dispersion medium or one obtained by treating the surface of a pigment with a resin, a pigment derivative, etc.). Specific examples of the pigment include those described in, for example, 'Ganryo no Jiten' (Dictionary of Pigments) Ed. by Seijirou Ito (2000, Asakura), I Hashimoto 'Yuki Ganryo Handobukku' (Organic Pigment Handbook), (2006, Color Office), W. Herbst, K. Hunger 'Industrial Organic Pigments' (1992, Wiley-VHC), JP-A-2002-12607, JP-A-2002-188025, JP-A-2003-26978, and JP-A-2003-342503.

Examples of the organic pigment and the inorganic pigment include a yellow pigment, a red pigment, a magenta pigment, a blue pigment, a cyan pigment, a green pigment, an orange pigment, a violet pigment, a brown pigment, a black pigment, and a white pigment.

Examples of the yellow pigment include monoazo pigments such as C.I. Pigment Yellow 1, 2, 3, 4, 5, 10, 65, 73, 74, 75, 97, 98, 111, 116, 130, 167, and 205, monoazo lake pigments such as C.I. Pigment Yellow 61, 62, 100, 168, 169, 183, 191, 206, 209, and 212, disazo pigments such as C.I. Pigment Yellow 12, 13, 14, 16, 17, 55, 63, 77, 81, 83, 97, 124, 126, 127, 152, 155, 172, 174, 176, 214, and 219, anthraquinone pigments such as C.I. Pigment Yellow 24, 108, 193, and 199, monoazo pyrazolone pigments such as C.I. Pigment Yellow 60, condensed azo pigments such as C.I. Pigment Yellow 93, 95, 128, and 166, isoindoline pigments such as C.I. Pigment Yellow 109, 110, 139, 173, and 185, benzimidazolone pigments such as C.I. Pigment Yellow 120, 151, 154, 175, 180, 181, and 194, azomethine metal complex pigments such as C.I. Pigment Yellow 117, 150, and 153, quinophthalone pigments such as C.I. Pigment Yellow 138, and quinoxaline pigments such as C.I. Pigment Yellow 213.

Preferred examples of the red or magenta pigment include monoazo pigments such as C.I. Pigment Red 3, monoazo lake pigments such as C.I. Pigment Red 193, disazo pigments such as C.I. Pigment Red 38, Naphthol AS pigments such as C.I. Pigment Red 2, 5, 8, 9, 10, 11, 12, 14, 15, 16, 17, 18, 22, 23, 31, 32, 112, 114, 146, 147, 150, 170, 187, 188, 210, 213, 238, 245, 253, 256, 258, 266, 268, and 269, β-naphthol pigments such as C.I. Pigment Red 3, 4, and 6, β-naphthol lake pigments such as C.I. Pigment Red 49, 53, and 68, Naphthol AS lake pigments such as C.I. Pigment Red 237, 239, and 247, pyrazolone pigments such as C.I. Pigment Red 41, BONA lake pigments such as C.I. Pigment Red 48, 52, 57, 58, 63, 64:1, and 200, xanthene lake pigments such as C.I. Pigment Red 81:1, 169, and 172, thioindigo pigments such as C.I. Pigment Red 88 and 181, perylene pigments such as C.I. Pigment Red 122, 202 (including a mixture with C.I. Pigment Violet 19), 123, 149, 178, 179, 190, and 224, condensed azo pigments such as C.I. Pigment Red 144, 166, 214, 220, 221, 242, and 262, anthraquinone pigments such as C.I. Pigment Red 168, 177, and 263, anthraquinone lake pigments such as C.I. Pigment Red 83, benzimidazolone pigments such as C.I. Pigment Red 171, 175, 176, 185, and 208, quinacridone pigments such as C.I. Pigment Red 207, 209, and 262, diketopyrrolopyrrole pigments such as C.I. Pigment Red 254, 255, 264, 270, and 272, and azomethine metal complex pigments such as C.I. Pigment Red 257 and 271.

Preferred examples of the blue or cyan pigment include Naphthol AS pigments such as C.I. Pigment Blue 25 and 26, phthalocyanine pigments such as C.I. Pigment Blue 15, 15:1, 15:2, 15:3, 15:4, 15:6, 16, and 17:1, dye lake pigments such as C.I. Pigment Blue 1, 24:1, and 56, and anthraquinone-based pigments such as C.I. Pigment Blue 60.

Preferred examples of the green pigment include dye lake pigments such as C.I. Pigment Green 1 and 4, phthalocyanine pigments such as C.I. Pigment Green 7 and 36, and azomethine metal complex pigments such as C.I. Pigment Green 8.

Preferred examples of the orange pigment include monoazo pigments such as C.I. Pigment Orange 1, β-naphthol pigments such as C.I. Pigment Orange 2, 3, and 5, Naphthol AS pigments such as C.I. Pigment Orange 4, 24, 38, and 74, pyrazolone pigments such as C.I. Pigment Orange 13 and 34, benzimidazolone pigments such as C.I. Pigment Orange 36, 60, 62, 64, and 72, disazo pigments such as C.I. Pigment Orange 15 and 16, β-naphthol lake pigments such as C.I. Pigment Orange 17 and 46, naphthalenesulfonic acid lake pigments such as C.I. Pigment Orange 19, perinone pigments such as C.I. Pigment Orange 43, quinacridone pigments such as C.I. Pigment Orange 48 and 49, anthraquinone-based pigments such as C.I. Pigment Orange 51, isoindolinone pigments such as C.I. Pigment Orange 61, isoindoline-based pigments such as C.I. Pigment Orange 66, azomethine metal complex pigments such as C.I. Pigment Orange 68, and diketopyrrolopyrrole pigments such as C.I. Pigment Orange 71, 73, and 81.

Preferred examples of the brown pigment include BONA lake pigments such as C.I. Pigment Brown 5, condensed azo pigments such as C.I. Pigment Brown 23, 41, and 42, and benzimidazolone pigments such as C.I. Pigment Brown 25 and 32.

Preferred examples of the violet pigment include dye lake pigments such as C.I. Pigment Violet 1, 2, 3, and 27, Naphthol AS pigments such as C.I. Pigment Violet 13, 17, 25, and 50, anthraquinone lake pigments such as C.I. Pigment Violet 5:1, quinacridone pigments such as C.I. Pigment Violet 19, dioxazine pigments such as C.I. Pigment Violet 23 and 37, perylene pigments such as C.I. Pigment Violet 29, benzimidazolone pigments such as C.I. Pigment Violet 32, and thioindigo pigments such as C.I. Pigment Violet 38.

Preferred examples of the black pigment include indazine pigments such as C.I. Pigment Black 1, carbon black, which is C.I. Pigment Black 7, graphite, which is C.I. Pigment Black 10, magnetite, which is C.I. Pigment Black 11, anthraquinone pigments such as C.I. Pigment Black 20, and perylene pigments such as C.I. Pigment Black 31 and 32.

Preferred examples of the white pigment include zinc oxide, which is C.I. Pigment White 4, titanium oxide, which is C.I. Pigment White 6, zinc sulfide, which is C.I. Pigment White 7, zirconium oxide (zirconium white), which is C.I. Pigment White 12, calcium carbonate, which is C.I. Pigment White 18, aluminum oxide•silicon oxide (Kaolin clay), which is C.I. Pigment White 19, barium sulfate, which is C.I. Pigment White 21 or 22, aluminum hydroxide (alumina white), which is C.I. Pigment White 23, silicon oxide, which is C.I. Pigment White 27, and calcium silicate, which is C.I. Pigment White 28.

Inorganic particles that are used as a white pigment may be a single substance or composite particles with an oxide of silicon, aluminum, zirconium, titanium, etc., an organic metal compound, or an organic compound.

Among them, the titanium oxide is suitably used since, compared with other white pigments, it has low specific gravity, a large refractive index, high hiding power and coloring power, and excellent durability toward acid, alkali, and other environments. In addition to the titanium oxide, another white pigment (which may be a white pigment other than those described above) may be used in combination.

The titanium oxide is not particularly limited and may be selected appropriately from known titanium oxides used as white pigments. Either rutile type titanium dioxide or anatase type titanium dioxide may be used, but rutile type titanium dioxide is preferably used from the viewpoint of low catalytic activity and excellent stability over time.

Titanium oxide is commercially available, and examples thereof include Tipaque CR60-2 and Tipaque A-220 (both from Ishihara Sangyo Kaisha Ltd.), and KRONOS 1001, 1014, 1071, 1074, 1075, 1077, 1078, 1080, 1171, 2044, 2047, 2056, 2063, 2080, 2081, 2084, 2087, 2160, 2190, 2211, 2220, 2222, 2225, 2230, 2233, 2257, 2300, 2310, 2450, 2500, 3000, and 3025 (all from KRONOS).

The titanium oxide may be subjected to a surface treatment as necessary. Specifically, it is treated with silica, alumina, zinc, zirconia, or an organic substance, and the weatherability and oleophilicity are varied according to the treatment method. In the present invention, one treated with alumina, zinc, zirconia, or a basic organic substance is preferable.

Oil-Soluble Dye

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called water-insoluble pigment or an oil-soluble colorant, and among these the oil-soluble colorant is preferable.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other types of dye such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, and anthrapyridones; and condensed polycyclic dyes such as dioxazine dyes.

Among the oil-soluble dyes that can be used in the present invention, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit the respective colors of yellow, magenta, and cyan only after a part of the chromophore (chromogenic atomic group) dissociates, and in that case a counter cation may be an inorganic cation such as an alkali metal or ammonium, may be an organic cation such as pyridinium or a quaternary ammonium salt, or may be a polymer cation having the above cations as a partial structure.

Although not limited to the following, preferred specific examples of the oil-soluble dyes include C.I. Solvent Black 3, 7, 27, 29, and 34; C.I. Solvent Yellow 14, 16, 19, 29, 30, 56, 82, 93, and 162; C.I. Solvent Red 1, 3, 8, 18, 24, 27, 43, 49, 51, 72, 73, 109, 122, 132, and 218; C.I. Solvent Violet 3; C.I. Solvent Blue 2, 11, 25, 35, 38, 67, and 70; C.I. Solvent Green 3 and 7; and C.I. Solvent Orange 2.

Particularly preferred examples thereof include NUBIAN BLACK PC-0850, OIL BLACK HBB, OIL YELLOW 129, OIL YELLOW 105, OIL PINK 312, OIL RED 5B, OIL SCARLET 308, VALI FAST BLUE 2606, and OIL BLUE BOS (manufactured by Orient Chemical Industries, Ltd.), AIZEN SPILON BLUE GNH (manufactured by Hodogaya Chemical Co., Ltd.), and NEOPEN YELLOW 075, NEOPEN MAGENTA SE1378, NEOPEN BLUE 808, NEOPEN BLUE FF4012, and NEOPEN CYAN FF4238 (manufactured by BASF).

Disperse Dye

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include C.I. Disperse Yellow 5, 42, 54, 64, 79, 82, 83, 93, 99, 100, 119, 122, 124, 126, 160, 184:1, 186, 198, 199, 201, 204, 224, and 237; C.I. Disperse Orange 13, 29, 31:1, 33, 49, 54, 55, 66, 73, 118, 119, and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and C.I. Disperse Green 6:1 and 9.

The colorant (G) that can be used in the present invention may be used singly or in a combination of two or more types.

In the present invention, the content of the colorant may be selected appropriately according to physical properties of the colorant (specific gravity, coloring power, color, etc.) and the color combination for the ink compositions to be used to form a printed material, but from the viewpoint of hiding power and coloring power it is preferably 0.1 to 30 wt %, more preferably 0.2 to 25 wt %, and particularly preferably 0.3 to 20 wt % relative to the weight of the entire ink composition.

In the present invention, the colorant may be added directly together with other components when preparing an ink composition, but may be added by adding and dispersing or dissolving it in advance in a medium such as a commonly used organic solvent (methyl ethyl ketone, toluene, butanol, butyl acetate, etc.) or a liquid such as a cationically polymerizable compound used in the present invention. In order to avoid the problems of degradation of solvent resistance and residual VOC (Volatile Organic Compound) due to the medium when it remains in a cured image, the colorant is preferably added after dispersing it in advance in a cationically polymerizable compound. Furthermore, when taking into consideration workability during formulation, it is preferable to select as the medium used a cationically polymerizable compound having the lowest viscosity.

In the present invention, when dispersion of a pigment is carried out, it is preferable to mix the pigment with a dispersant and then add it to a radically polymerizable compound to thus disperse it, or mix a radically polymerizable compound with a dispersant and then add the pigment thereto to thus disperse it. For dispersion, for example, dispersing equipment such as a ball mill, a sand mill, a salt mill, an attritor, a roll mill, an agitator, a Henschel mixer, a colloidal mill, an ultrasonic homogenizer, a pearl mill, a wet type jet mill, or a paint shaker may be used.

When a pigment is used as the colorant, it is preferable to select pigment, dispersant, and medium and set dispersion conditions and filtration conditions so that the pigment particles preferably have an average particle size of 0.005 to 0.5 µm, more preferably 0.01 to 0.45 µm, and yet more preferably 0.015 to 0.4 µm. When the average particle size is in the above-mentioned range, it is possible to suppress clogging of a head nozzle and maintain the storage stability, transparency, and cure rate of the ink composition.

In the ink composition of the present invention, when a pigment is used as a colorant it is preferable for the ink composition to contain a dispersant in order to disperse the pigment stably in the ink composition.

The dispersant that can be used in the present invention is preferably a polymeric dispersant. The 'polymeric dispersant' referred to in the present invention means a dispersant having a weight-average molecular weight of 1,000 or greater.

The main chain skeleton of the polymeric dispersant is not particularly limited; examples thereof include a polyurethane skeleton, a polyacrylic skeleton, a polyester skeleton, a polyamide skeleton, a polyimide skeleton, and a polyurea skeleton, and from the viewpoint of storage stability of the ink composition a polyurethane skeleton, a polyacrylic skeleton, and a polyester skeleton are preferable. Furthermore, the structure of the polymeric dispersant is not particularly limited; examples thereof include a random structure, a block structure, a comb-shaped structure, and a star-shaped structure, and similarly from the viewpoint of storage stability a block structure or a comb-shaped structure is preferable.

Examples of the polymeric dispersant include 101, 102, 103, 106, 108, 109, 110, 111, 112, 116, 130, 140, 142, 145, 161, 162, 163, 164, 166, 167, 168, 170, 171, 174, 180, 182, 183, 184, 185, 2000, 2001, 2020, 2050, 2070, 2096, and 2150 of the wetting and dispersing agent DISPERBYK series commercially available from BYK Chemie, 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070, and 5244 of the EFKA series commercially available from Ciba Specialty Chemicals, 3000, 5000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 53095, 54000, 55000, 56000, and 71000 of the SOLSPERSE series commercially available from the Lubrizol Corporation, 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401, and DA-7301 of the DISPARLON series commercially available from Kusumoto Chemicals, Ltd., PB-711, PB-821, PB-822, PN-411, and PA-111 of the AJISPER series commercially available from Ajinomoto Co., Inc., 104A, 104C, 104E, 104H, 104S, 104BC, 104DPM, 104PA, 104PG-50, 420, 440, DF110D, DF110L, DF37, DF58, DF75, DF210, CT111, CT121, CT131, CT136, GA, TG, and TGE of the SURFINOL series commercially available from Air Products, Inc., STG and E1004 of the OLFINE series commercially available from Nissin Chemical Industry Co., Ltd., 70, 2120, and 2190 of the SN-Sperse series from SAN NOPCO Ltd., the ADEKA COL and ADEKA TOL series commercially available from ADEKA, and the SANNONIC series, the NAROACTY CL series, the EMULMIN series, the Newpol PE series, the IONET M series, the IONET D series, the IONET S series, the IONET T series, and SANSEPARA 100 commercially available from Sanyo Chemical Industries, Ltd.

When carrying out dispersion, it is also preferable to add, in addition to a dispersant, a dispersion adjuvant, which is generally called a synergist (e.g. 5000, 12000, and 22000 of the SOLSPERSE series commercially available from the Lubrizol Corporation, EFKA6745 commercially available from Ciba Specialty Chemicals, etc.), various types of surfactants, or an antifoaming agent, thus improving the dispersibility and wettability of the pigment.

In the present invention, with regard to the ratio by weight of the dispersant relative to the pigment, when the weight of the pigment in the ink composition is P and the weight of the dispersant in the ink composition is D, the ratio by weight (D/P) is preferably $0.5 \leq D/P \leq 15$, more preferably $1 \leq D/P \leq 10$, and yet more preferably $1.2 \leq D/P \leq 8$. When in the above-mentioned range, there is no aggregation/precipitation of the pigment, the ink viscosity does not increase, and an ink composition having excellent storage stability can thus be obtained, and an ink composition having a low ink viscosity and excellent discharge properties can be also obtained.

(H) Other Component

The ink composition of the present invention may comprise (H) another component as necessary. Examples of the other component include a cosensitizer, a surfactant, a UV absorber, an antioxidant, an antifading agent, a conductive salt, a solvent, a high molecular weight compound, and a basic compound.

Cosensitizer

The ink composition of the present invention preferably comprises a cosensitizer. In the present invention, the cosensitizer has the function of further improving the sensitivity of the sensitizer to actinic radiation or the function of suppressing inhibition by oxygen of polymerization of a polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825.

Specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643.

Specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

The content of the cosensitizer in the ink composition of the present invention is appropriately selected according to the intended purpose, but it is generally preferably 0.05 to 4 wt % relative to the weight of the entire ink composition.

Surfactant

It is preferable to add a surfactant to the ink composition of the present invention in order to impart long-term discharge stability.

As the surfactant, those described in JP-A-62-173463 and 62-183457 can be cited. Examples thereof include anionic surfactants such as dialkylsulfosuccinic acid salts, alkylnaphthalene sulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. An organofluoro compound may be used instead of the above-mentioned surfactant. The organofluoro compound is preferably hydrophobic. Examples of the organofluoro compound include fluorine-based surfactants, oil-like fluorine-based compounds (e.g. fluorine oil), solid fluorine compound resins (e.g. tetrafluoroethylene resin), and those described in JP-B-57-9053 (paragraphs 8 to 17) and JP-A-62-135826.

The examples of the surfactant include preferably polydialkylsiloxanes and more preferably a polyethoxy modified methylsiloxane.

The content of the surfactant in the ink composition of the present invention is appropriately selected according to the intended purpose, and it is preferably 0.0001 to 1 wt % for each surfactant relative to the weight of the entire ink composition.

UV Absorber

A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (JP-W denotes an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the ink composition.

Antioxidant

In order to improve the stability of the ink composition, an antioxidant may be added. Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is generally on the order of 0.1 to 8 wt % on the basis of the solids content in the ink composition.

Antifading Agent

The ink composition of the present invention may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-215272, pages 127 to 137.

The amount thereof added is appropriately selected according to the intended application, and it is generally on the order of 0.1 to 8 wt % on the basis of the solids content in the ink composition.

Conductive Salt

The ink composition of the present invention may contain, for the purpose of controlling discharge properties, a conductive salt such as potassium thiocyanate, lithium nitrate, ammonium thiocyanate, or dimethylamine hydrochloride.

Solvent

It is also effective to add a trace amount of organic solvent to the ink composition of the present invention in order to improve the adhesion to a recording medium.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably in the range of 0.1 to 5 wt % relative to the total amount of the ink composition, and more preferably 0.1 to 3 wt %.

High Molecular Weight Compound

The ink composition may contain various types of high molecular weight compounds in order to adjust film physical properties. Examples of the high molecular weight compounds include acrylic resins, polyvinylbutyral resins, polyurethane resins, polyamide resins, polyester resins, epoxy resins, phenol resins, polycarbonate resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

Basic Compound

It is preferable to add the basic compound from the viewpoint of improving the storage stability of the ink composition. As the basic compound that can be used in the present invention, a known basic compound may be used and, for example, a basic inorganic compound such as an inorganic salt or a basic organic compound such as an amine is preferably used.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth)acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Properties of Ink Composition

In the present invention, from the viewpoint of dischargability, the ink composition of the present invention has a viscosity at 25° C. of preferably no more than 40 mPa·s, more preferably 5 to 40 mPa·s, and yet more preferably 7 to 30 mPa·s.

Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink into the recording medium can be prevented, and uncured monomer can be reduced. Furthermore, ink spreading when ink droplets have landed can be suppressed, and as a result there is the advantage that the image quality is improved.

The surface tension at 25° C. of the ink composition of the present invention is preferably 20 to 35 mN/m, and more preferably 23 to 33 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 35 mN/m.

(2) Inkjet Recording Method, Inkjet Recording Device and Printed Material

The ink composition of the present invention is used for inkjet recording.

The inkjet recording method of the present invention is a method for forming an image by discharging the ink composition of the present invention onto a recording medium (support, recording material, etc.) for inkjet recording and curing the ink by irradiating the ink composition so discharged onto the recording medium with actinic radiation.

More particularly, the inkjet recording method of the present invention comprises ($a^1$) a step of discharging the ink composition according to any one of <1> to <8> onto a recording medium and ($b^1$) a step of curing the ink composition by irradiating the ink composition so discharged with actinic radiation.

The inkjet recording method of the present invention comprises the steps ($a^1$) and ($b^1$) above and thus forms an image from the ink composition cured on the recording medium.

The printed material of the present invention is a printed material obtained using the ink composition and recorded by the inkjet recording method of the present invention.

The above-described discharging is preferably carried out using an inkjet head that discharges an ink composition by means of deformation of a piezoelectric element.

The above-described discharge is preferably carried out under the condition of 1 to 10 pL liquid amount, and 1,200×1,200 to 4,800×4,800 dpi.

The step ($a^1$) of the inkjet recording method of the present invention may employ an inkjet recording device that will be described in detail below.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition onto a recording medium in step ($a^1$) of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink supply tank immediately before an inkjet head, a filter, and a piezo system inkjet head. The piezo system inkjet head may be driven so as to discharge a multisize dot of preferably 1 to 100 pL, and more preferably 1 to 10 pL, at a resolution of preferably 300×300 to 4,800×4,800 dpi, and more preferably 1,200×1,200 to 4,800×4,800 dpi. Here, dpi referred to in the present invention means the number of dots per 2.54 cm.

Furthermore, in the inkjet recording method in the present invention, the inkjet head discharging the inkjet composition by the deformation of a piezoelectric element, or what is called inkjet head of piezo type, is preferably used.

As described above, since it is desirable for the radiation curing type ink such as the ink composition of the present invention to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since a good discharge stability can be obtained. By employing this method, high discharge stability can be realized.

The radiation curing type ink composition such as the ink composition of the present invention generally has a viscosity that is higher than that of a normal ink composition or a water-based ink used for an inkjet recording ink composition, and variation in viscosity due to a change in temperature at the time of discharge is large. Viscosity variation in the ink composition has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature is preferably ±5° C. of a set temperature, more preferably ±2° C. of the set temperature, and yet more preferably ±1° C. of the set temperature.

The step ($b^1$) of curing the discharged ink composition by irradiating the ink composition with actinic radiation is now explained.

The ink composition discharged onto the recording medium cures upon exposure to actinic radiation. This is due to an initiating species such as a radical, an acid, or a base being generated by decomposition of the polymerization initiator contained in the ink composition of the present invention by irradiation with actinic radiation, the initiating species functioning so as to make a polymerization reaction of a radically polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizer, the peak wavelength of the actinic radiation is, preferably 200 to 600 nm, more preferably 300 to 450 nm, and yet more preferably 350 to 420 nm.

Furthermore, the radical polymerization initiation system of the ink composition of the present invention has sufficient sensitivity for low output actinic radiation. Therefore, the illumination intensity on the exposed surface is preferably 10 to 4,000 mW/cm², and more preferably 20 to 2,500 mW/cm².

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

As described above, the ink composition of the present invention comprises the photopolymerization initiator (B) having absorption in a wavelength region that includes 365 nm, and the acrylate monomer having a hydrogen atom on an atom at the α-position of an ether oxygen atom. Therefore, the ink composition of the present invention can be cured with a low exposure even when a UV-LED is used as an actinic radiation source.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The ink composition of the present invention is desirably exposed to such actinic radiation for, preferably 0.01 to 120 sec., and more preferably 0.1 to 90 sec.

Irradiation conditions and a basic method for irradiation with actinic radiation are disclosed in JP-A-60-132767. Specifically, a light source is provided on either side of a head unit that includes an ink discharge device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the ink has landed. By controlling the time from ink landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a recording method, it is possible to maintain a uniform dot diameter for landed ink composition even for various types of recording media having different surface wettability, thereby improving the image quality. In order to obtain a color image, it is preferable to superimpose colors in order from those with a low lightness. By superimposing ink compositions in order from one with low lightness, it is easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way, the ink composition of the present invention is cured by irradiation with actinic radiation in high sensitivity to thus form an image on the surface of the recording medium.

In the present invention, the recording medium is not particularly limited, and a recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

In accordance with the present invention, there can be provided an ink composition that can be cured with a low exposure using as an actinic radiation source an LED, in particular a UV-LED, and that has excellent curability and flexibility, and an inkjet recording method employing the ink composition.

EXAMPLES

The present invention is explained below in further detail by reference to Examples and Comparative Examples. However, the present invention should not be construed as being limited to these Examples.

Compounds used in the Examples are listed below.

Pigments
C pigment (cyan pigment): Sun 249-1284 pigment (Sun Chemical)
M pigment (magenta pigment): CIBA RT343-D pigment (Ciba Specialty Chemicals)
Y pigment (yellow pigment): BAYER Y-5688 pigment (BAYER)
K pigment (black pigment): Lampblack LB-1011 (Pfizer Inc)
W pigment (white pigment): alumina-treated titanium oxide
Dispersants
Solsperse 2000 (Avecia)
Solsperse 32000 (Avecia)
Solsperse 5000 (Avecia)
Solsperse 36000 (Avecia)
BYK168 (BYK Chemie)
Monomers
As the acrylate monomer represented by Formula (I), M-5, M-8, and M-13, which are described above, were used.
As the compounds represented by Formula (V-1) to Formula (V-3) above, the monomers shown below were used.
NVC (Aldrich)
IBOA (Tokyo Chemical Industry Co., Ltd.)
FA-512A (Hitachi Chemical Co., Ltd.)
The monomers below were also used.
4-Hydroxybutyl acrylate (Aldrich)
HDDA (1,6-hexanediol diacrylate (Daicel-Cytec Company Ltd.))
Photopolymerization Initiators As the photopolymerization initiator represented by Formula (II) above, A-1, A-16, B-1, B-21, C-1, and C-14 were used.

As the other photopolymerization initiator, the photopolymerization initiators shown below were used.
DAROCUR TPO (Ciba Specialty Chemicals)
IRGACURE 819 (Ciba Specialty Chemicals)
IRGACURE 907 (Ciba Specialty Chemicals)
IRGACURE 127 (Ciba Specialty Chemicals)
Sensitizer
FIRSTCURE ITX (Shell Chemicals)
Amine Compound
CN371 (Cray Valley)
Method for Synthesizing C-14

Benzoyl chloride (Aldrich: 14.1 g, 0.10 mol) and aluminum trichloride (Aldrich: 13.3 g, 0.10 mol) were added to 100 mL of diethyl ether, and a reaction was carried out for 6 hours while gradually increasing the reaction temperature from −78° C. to room temperature.

N-Methyldiphenylamine (18.3 g, 0.10 mol) was further added to the reaction product, thus giving the target C-14 in a yield of 71% (20.4 g, 0.07 mol).

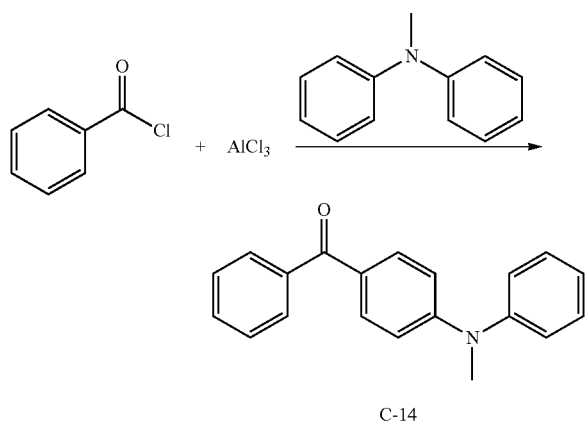

C-14

Method for Synthesizing A-1, A-16, B-1, B-21, and C-1

A-1, A-16, B-1, B-21, and C-1 were synthesized by substantially the same method as the method for synthesizing C-14 except that the reaction substrate was changed.

Preparation of Cyan Mill Base C

| | |
|---|---|
| C pigment (cyan pigment): Sun 249-1284 pigment | 23 parts by weight |
| THFA | 42 parts by weight |
| Solsperse 5000 | 25 parts by weight |
| Solsperse 32000 | 10 parts by weight |

The above components were stirred to give cyan mill base C. Preparation of the pigment mill base was carried out by putting it into an M50 disperser motor mill (manufactured by Eiger) and dispersing using zirconia beads having a diameter of 0.65 mm at a peripheral speed of 9 m/s for 8 hours.
Preparation of Magenta Mill Base M

| | |
|---|---|
| M pigment (magenta pigment): CIBA RT343-D pigment | 33 parts by weight |
| THFA | 55 parts by weight |
| Solsperse 32000 | 12 parts by weight |

The above components were stirred to give magenta mill base M. Preparation of the pigment mill base was carried out by putting it into an M50 disperser motor mill (manufactured by Eiger) and dispersing using zirconia beads having a diameter of 0.65 mm at a peripheral speed of 9 m/s for 8 hours.
Preparation of Yellow Mill Base Y

| | |
|---|---|
| Y pigment (yellow pigment): BAYER Y-5688 pigment | 33 parts by weight |
| THFA | 57 parts by weight |
| Solsperse 2000 | 10 parts by weight |

The above components were stirred to give yellow mill base Y. Preparation of the pigment mill base was carried out by putting it into an M50 disperser motor mill (manufactured by Eiger) and dispersing using zirconia beads having a diameter of 0.65 mm at a peripheral speed of 9 m/s for 8 hours.
Preparation of Black Mill Base K

| | |
|---|---|
| K pigment (black pigment): SPECIAL BLACK 250 (Ciba Specialty Chemicals) | 25 parts by weight |
| THFA | 70 parts by weight |
| Solsperse 32000 | 5 parts by weight |

The above components were stirred to give black mill base K. Preparation of the pigment mill base was carried out by putting it into an M50 disperser motor mill (manufactured by Eiger) and dispersing using zirconia beads having a diameter of 0.65 mm at a peripheral speed of 9 m/s for 8 hours.
Preparation of White Mill Base W

| | |
|---|---|
| W pigment (white pigment): alumina-treated titanium oxide | 60 parts by weight |
| HDDA | 36 parts by weight |
| Solsperse 36000 | 4 parts by weight |

The above components were stirred to give white mill base W. Preparation of the pigment mill base was carried out by putting it into an M50 disperser motor mill (manufactured by Eiger) and dispersing using zirconia beads having a diameter of 0.65 mm at a peripheral speed of 9 m/s for 8 hours.

Examples 1 to 52 and Comparative Examples 1 to 9

Preparation of Ink Compositions

Mill bases, polymerizable compounds, polymerization initiators, and additives were mixed according to the formulations shown in Tables 1 to 6 and stirred at high speed, thus giving ink compositions.
Inkjet Image Recording Method Subsequently, recording was carried out on a recording medium using a commercial inkjet recording system having piezo type inkjet nozzles. The ink supply system comprised a main tank, a supply pipe, an ink supply tank immediately before an inkjet head, a filter, and a piezo type inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 40° C.±2° C. The piezo type inkjet head was driven so as to discharge multisize dots of 1 to 10 pL at a resolution of 4,800×4,800 dpi. The exposure system, the main scanning speed, and the discharge frequency were adjusted so that, after landing, UV light was focused to give an exposure area illumination intensity of 700 mW/cm², and irradiation started 0.1 sec. after the ink composition landed on the recording medium. The exposure time was variable, and exposure energy was applied. The UV lamp employed a UV-LED. Here, dpi referred to in the present invention denotes the number of dots per 2.54 cm. The recording medium employed an E5000 ester film (film thickness 125 μm, manufactured by Toyobo Co., Ltd.).

Evaluation of Inkjet Image
Curability

In accordance with the inkjet recording method above, a solid image having an average coating thickness of 12 μm was drawn, and the exposure energy quantity (mJ/cm²) that eliminated tackiness for the image surface after irradiation with UV rays was defined as curing sensitivity. The smaller the value, the higher the sensitivity.

Furthermore, the curing sensitivity was evaluated by means of the criteria below.
10 Less than 150 mJ/cm²
9 At least 150 mJ/cm² but less than 300 mJ/cm²
8 At least 300 mJ/cm² but less than 500 mJ/cm²
7 At least 500 mJ/cm² but less than 1,000 mJ/cm²
6 At least 1,000 mJ/cm² but less than 1,500 mJ/cm²
5 At least 1,500 mJ/cm² but less than 2,000 mJ/cm²
4 At least 2,000 mJ/cm² but less than 2,500 mJ/cm²
3 At least 2,500 mJ/cm² but less than 3,000 mJ/cm²
2 At least 3,000 mJ/cm² but less than 3,500 mJ/cm²
1 At least 3,500 mJ/cm²

Flexibility of Cured Film

The flexibility of a cured film was evaluated using the criteria below by stretching, together with a polyvinyl chloride sheet, at room temperature (about 25° C.) a printed material having a length of 6 cm and a width of 2 cm recorded by the inkjet recording method, and measuring the percentage elongation until the image broke.
10 Percentage elongation was at least 100%
9 Percentage elongation was at least 90% but less than 100%
8 Percentage elongation was at least 80% but less than 90%
7 Percentage elongation was at least 70% but less than 80%
6 Percentage elongation was at least 60% but less than 70%
5 Percentage elongation was at least 55% but less than 60%
4 Percentage elongation was at least 50% but less than 55%
3 Percentage elongation was at least 45% but less than 50%
2 Percentage elongation was at least 40% but less than 45%
1 Percentage elongation was less than 40%

The compositions and evaluation results of the ink compositions are summarized in Tables 1 to 6 below. The figures showing the constitutions of the ink compositions are expressed in units of parts by weight.

TABLE 1

| | Example | 1 | 2 | 3 | 4 | 5 | 6 | 7 | 8 | 9 | 10 | 11 | 12 |
|---|---|---|---|---|---|---|---|---|---|---|---|---|---|
| Mill base | Y | 10 | 10 | 10 | 10 | 10 | 10 | 10 | 10 | 10 | 10 | 10 | 10 |
| Photopolymerization initiator | A-1 | 0.5 | 1 | 5 | 10 | 15 | 20 | 25 | 5 | 5 | 5 | 5 | 5 |
| | A-16 | — | — | — | — | — | — | — | — | — | — | — | — |
| | B-1 | — | — | — | — | — | — | — | — | — | — | — | — |
| | B-21 | — | — | — | — | — | — | — | — | — | — | — | — |
| | C-1 | — | — | — | — | — | — | — | — | — | — | — | — |
| | C-14 | — | — | — | — | — | — | — | — | — | — | — | — |
| | DAROCUR TPO | 10.5 | 10 | 6 | 1 | 0 | 0 | 0 | 6 | 6 | 6 | 6 | 6 |
| | IRGACURE 819 | 3 | 3 | 3 | 3 | 3 | 3 | 3 | 3 | 3 | 3 | 3 | 3 |
| | FIRSTCURE ITX | — | — | — | — | — | — | — | 0.5 | 1 | 1.5 | 3 | 5 |
| Monomer | M-13 | 25 | 25 | 25 | 25 | 25 | 25 | 25 | 25 | 25 | 25 | 25 | 25 |
| | FA-512A | 41 | 41 | 41 | 41 | 37 | 32 | 27 | 40.5 | 40 | 39.5 | 38 | 36 |
| | NVC | — | — | — | — | — | — | — | — | — | — | — | — |
| | IBOA | — | — | — | — | — | — | — | — | — | — | — | — |
| | HDDA | 10 | 10 | 10 | 10 | 10 | 10 | 10 | 10 | 10 | 10 | 10 | 10 |
| Amine compound | CN371 | — | — | — | — | — | — | — | — | — | — | — | — |
| | Total | 100 | 100 | 100 | 100 | 100 | 100 | 100 | 100 | 100 | 100 | 100 | 100 |
| Evaluation result | Curability | 6 | 7 | 8 | 8 | 8 | 7 | 6 | 8 | 9 | 9 | 9 | 8 |
| | Flexibility of cured film | 7 | 7 | 8 | 8 | 7 | 6 | 6 | 8 | 8 | 9 | 9 | 9 |

TABLE 2

| | Example | 13 | 14 | 15 | 16 | 17 | 18 | 19 | 20 | 21 | 22 | 23 |
|---|---|---|---|---|---|---|---|---|---|---|---|---|
| Mill base | Y | 10 | 10 | 10 | 10 | 10 | 10 | 10 | 10 | 10 | 10 | 10 |
| Photopolymerization initiator | A-1 | 5 | 5 | 5 | 5 | 5 | 5 | — | — | — | — | — |
| | A-16 | — | — | — | — | — | — | 5 | — | — | — | — |
| | B-1 | — | — | — | — | — | — | — | 5 | — | — | — |
| | B-21 | — | — | — | — | — | — | — | — | 5 | — | — |
| | C-1 | — | — | — | — | — | — | — | — | — | 5 | — |
| | C-14 | — | — | — | — | — | — | — | — | — | — | 5 |
| | DAROCUR TPO | 6 | 6 | 6 | 6 | 6 | 6 | 6 | 6 | 6 | 6 | 6 |
| | IRGACURE 819 | 3 | 3 | 3 | 3 | 3 | 3 | 3 | 3 | 3 | 3 | 3 |
| | FIRSTCURE ITX | 7.5 | 2.5 | 2.5 | 2.5 | 2.5 | 2.5 | 2.5 | 2.5 | 2.5 | 2.5 | 2.5 |
| Monomer | M-13 | 25 | 25 | 25 | 25 | 25 | 25 | 25 | 25 | 25 | 25 | 25 |
| | FA-512A | 33.5 | 38 | 37.5 | 33.5 | 23.5 | 18.5 | 33.5 | 33.5 | 33.5 | 33.5 | 33.5 |
| | NVC | — | — | — | — | — | — | — | — | — | — | — |

TABLE 2-continued

| | Example | 13 | 14 | 15 | 16 | 17 | 18 | 19 | 20 | 21 | 22 | 23 |
|---|---|---|---|---|---|---|---|---|---|---|---|---|
| | IBOA | — | — | — | — | — | — | — | — | — | — | — |
| | HDDA | 10 | 10 | 10 | 10 | 10 | 10 | 10 | 10 | 10 | 10 | 10 |
| Amine compound | CN371 | — | 0.5 | 1 | 5 | 15 | 20 | 5 | 5 | 5 | 5 | 5 |
| | Total | 100 | 100 | 100 | 100 | 100 | 100 | 100 | 100 | 100 | 100 | 100 |
| Evaluation result | Curability | 7 | 9 | 9 | 10 | 9 | 8 | 10 | 10 | 10 | 10 | 10 |
| | Flexibility of cured film | 8 | 9 | 10 | 10 | 10 | 9 | 10 | 10 | 10 | 10 | 10 |

TABLE 3

| | Example | 24 | 25 | 26 | 27 | 28 | 29 | 30 | 31 | 32 | 33 | 34 |
|---|---|---|---|---|---|---|---|---|---|---|---|---|
| Mill base | Y | 10 | 10 | 10 | 10 | 10 | 10 | 10 | 10 | 10 | 10 | 10 |
| Photopolymerization initiator | A-1 | 5 | 5 | 5 | 5 | 5 | 5 | 5 | 5 | 5 | 5 | 5 |
| | DAROCUR TPO | 6 | 6 | 6 | 6 | 6 | 6 | 6 | 6 | 6 | 6 | 6 |
| | IRGACURE 819 | 3 | 3 | 3 | 3 | 3 | 3 | 3 | 3 | 3 | 3 | 3 |
| | FIRSTCURE ITX | 1 | 1 | 1 | 1 | 1 | 1 | 1 | 1 | 1 | 1 | 1 |
| Monomer | M-5 | — | — | — | — | — | — | — | — | 25 | — | — |
| | M-8 | — | — | — | — | — | — | — | 25 | — | — | — |
| | M-13 | 3 | 5 | 25 | 50 | 55 | 25 | 25 | — | — | 25 | 25 |
| | FA-512A | 57 | 55 | 35 | 10 | 5 | — | — | 35 | 35 | 5 | 7.5 |
| | NVC | — | — | — | — | — | 35 | — | — | — | — | — |
| | IBOA | — | — | — | — | — | — | 35 | — | — | — | — |
| | HDDA | 10 | 10 | 10 | 10 | 10 | 10 | 10 | 10 | 10 | 45 | 42.5 |
| Amine compound | CN371 | 5 | 5 | 5 | 5 | 5 | 5 | 5 | 5 | 5 | 5 | — |
| | Total | 100 | 100 | 100 | 100 | 100 | 100 | 100 | 100 | 100 | 100 | 100 |
| Evaluation result | Curability | 8 | 9 | 9 | 8 | 8 | 9 | 9 | 9 | 9 | 10 | 9 |
| | Flexibility of cured film | 8 | 8 | 10 | 10 | 9 | 10 | 10 | 10 | 10 | 6 | 7 |

TABLE 4

| | Example | 35 | 36 | 37 | 38 | 39 | 40 | 41 | 42 | 43 | 44 |
|---|---|---|---|---|---|---|---|---|---|---|---|
| Mill base | Y | 10 | 10 | 10 | 5 | 10 | 10 | 10 | 10 | 10 | 5 |
| Photopolymerization initiator | A-1 | 5 | 5 | 5 | 5 | 5 | 5 | 5 | 5 | 5 | 5 |
| | DAROCUR TPO | 6 | 1 | — | — | 6 | 6 | 6 | 1 | — | — |
| | IRGACURE 819 | 3 | 3 | — | — | 3 | 3 | 3 | 3 | — | — |
| | FIRSTCURE ITX | 1 | 1 | — | — | 1 | 1 | 1 | 1 | — | — |
| Monomer | M-5 | — | — | — | — | — | — | — | — | — | — |
| | M-8 | — | — | — | — | — | — | — | — | — | — |
| | M-13 | 25 | 5 | 5 | 5 | 25 | 25 | 25 | 45 | 45 | 45 |
| | FA-512A | 10 | 75 | 80 | 85 | 5 | 7.5 | 10 | 35 | 40 | 45 |
| | NVC | — | — | — | — | — | — | — | — | — | — |
| | IBOA | — | — | — | — | — | — | — | — | — | — |
| | HDDA | 40 | — | — | — | 45 | 42.5 | 40 | — | — | — |
| Amine compound | CN371 | — | — | — | — | 5 | — | — | — | — | — |
| | Total | 100 | 100 | 100 | 100 | 100 | 100 | 100 | 100 | 100 | 100 |
| Evaluation result | Curability | 9 | 8 | 8 | 6 | 9 | 8 | 8 | 8 | 8 | 6 |
| | Flexibility of cured film | 8 | 9 | 8 | 7 | 6 | 7 | 8 | 8 | 7 | 6 |

TABLE 5

| | Example | 45 | 46 | 47 | 48 | 49 | 50 | 51 | 52 |
|---|---|---|---|---|---|---|---|---|---|
| Mill base | M | 16 | 16 | — | — | — | — | — | — |
| | C | — | — | 9 | 9 | — | — | — | — |
| | K | — | — | — | — | 9 | 9 | — | — |
| | W | — | — | — | — | — | — | 30 | 30 |
| Photopolymerization initiator | A-1 | 5 | — | 5 | — | 5 | — | 5 | — |
| | A-16 | — | 5 | — | 5 | — | 5 | — | 5 |
| | DAROCUR TPO | 6 | 6 | 6 | 6 | 6 | 6 | 6 | 6 |
| | IRGACURE 819 | 3 | 3 | 3 | 3 | 3 | 3 | 3 | 3 |
| | FIRSTCURE ITX | 1 | 1 | 1 | 1 | 1 | 1 | — | — |
| Monomer | M-13 | 25 | 25 | 32 | 32 | 32 | 32 | 25 | 25 |
| | FA-512A | 29 | 29 | 29 | 29 | 29 | 29 | 16 | 16 |

TABLE 5-continued

| Example | | 45 | 46 | 47 | 48 | 49 | 50 | 51 | 52 |
|---|---|---|---|---|---|---|---|---|---|
| Amine compound | HDDA | 10 | 10 | 10 | 10 | 10 | 10 | 10 | 10 |
| | CN371 | 5 | 5 | 5 | 5 | 5 | 5 | 5 | 5 |
| Evaluation result | Total | 100 | 100 | 100 | 100 | 100 | 100 | 100 | 100 |
| | Curability | 9 | 9 | 9 | 9 | 9 | 9 | 9 | 9 |
| | Flexibility of cured film | 10 | 10 | 10 | 10 | 10 | 10 | 10 | 10 |

TABLE 6

| Comparative Example | | 1 | 2 | 3 | 4 | 5 | 6 | 7 | 8 | 9 |
|---|---|---|---|---|---|---|---|---|---|---|
| Mill base | Y | 10 | 10 | 10 | 10 | 5 | — | — | — | — |
| | M | — | — | — | — | — | 16 | — | — | — |
| | C | — | — | — | — | — | — | 9 | — | — |
| | K | — | — | — | — | — | — | — | 9 | — |
| | W | — | — | — | — | — | — | — | — | 30 |
| Photopolymerization initiator | DAROCUR TPO | 5 | 5 | 5 | 5 | — | 5 | 5 | 5 | 5 |
| | IRGACURE 907 | 5 | 5 | 5 | — | — | 5 | 5 | 5 | 5 |
| | IRGACURE 127 | 2.5 | 2.5 | 2.5 | — | — | 2.5 | 2.5 | 2.5 | 2.5 |
| | A-1 | — | — | — | 5 | 2.5 | — | — | — | — |
| Monomer | M-13 | 3 | — | — | 25 | 92.5 | — | — | — | — |
| | FA-512A | 26 | 15 | 15 | — | — | 15 | 15 | 15 | 15 |
| | 4-Butyl acrylate | 23.5 | 32.5 | — | — | — | — | — | — | — |
| | HDDA | — | — | 32.5 | 55 | — | 26.5 | 33.5 | 33.5 | 12.5 |
| Evaluation result | Total | 100 | 100 | 100 | 100 | 100 | 100 | 100 | 100 | 100 |
| | Curability | 3 | 2 | 2 | 8 | 3 | 2 | 2 | 1 | 1 |
| | Flexibility of cured film | 6 | 6 | 2 | 1 | 7 | 3 | 2 | 2 | 1 |

The invention claimed is:

1. An ink composition comprising:

(A) a monofunctional monomer comprising an acrylate monomer represented by Formula (I); and (B) a photopolymerization initiator represented by Formula (II), the monofunctional monomer (A) having a content of 30 to 90 wt %

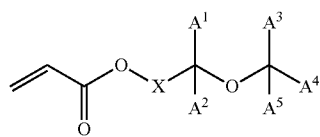

wherein $A^1$ to $A^5$ independently denote a hydrogen atom, an alkyl group, an alkoxy group, $-L^1-(OR^1)_n-R^2$, or an amino group, $L^1$ denotes a single bond or an alkylene group, $R^1$ denotes an alkylene group, $R^2$ denotes a hydrogen atom or an alkoxy group, n denotes an integer of 1 or greater, at least one of $A^1$ to $A^5$ denotes a hydrogen atom, any two of $A^1$ to $A^5$ may be bonded to each other to form a ring, and X denotes an alkylene group, a group formed by combining two or more alkylene groups and one or more ether bonds, or a group formed by combining two or more alkylene groups and one or more ester bonds,

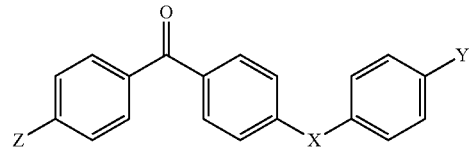

wherein X denotes $NCH_3$, an oxygen atom, or a sulfur atom, and Y and Z independently denote a hydrogen atom, a methyl group, a hydroxy group, an alkoxy group, an amino group, a thiol group, a morpholino group, a phenyl group, or an acyl group.

2. The ink composition according to claim 1, wherein the acrylate monomer represented by Formula (I) has a content of 5 to 50 wt % relative to the total weight of the ink composition.

3. The ink composition according to claim 1, wherein the acrylate monomer represented by Formula (I) is a compound represented by Formula (III)

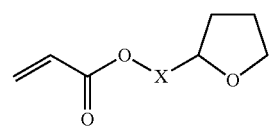

wherein X denotes an alkylene group, a group formed by combining two or more alkylene groups and one or more ether bonds, or a group formed by combining two or more alkylene groups and one or more ester bonds.

4. The ink composition according to claim 3, wherein the compound represented by Formula (III) is tetrahydrofurfuryl acrylate.

5. The ink composition according to claim 1, wherein the photopolymerization initiator (B) is a compound represented by Formula (IV)

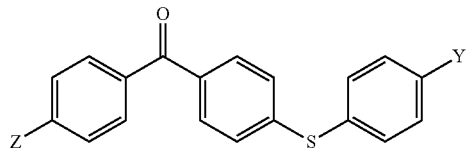
(IV)

wherein Y and Z independently denote a hydrogen atom, a methyl group, a hydroxy group, an alkoxy group, an amino group, a thiol group, a morpholino group, a phenyl group, or an acyl group.

6. The ink composition according to claim 1, wherein the photopolymerization initiator (B) has a content of 1 to 20 wt % relative to the total weight of the ink composition.

7. The ink composition according to claim 1, wherein the monofunctional monomer (A) further comprises one or more types of compounds selected from the group consisting of compounds represented by Formula (V-1) to Formula (V-3)

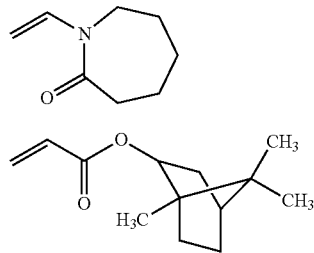
(V-1)
(V-2)

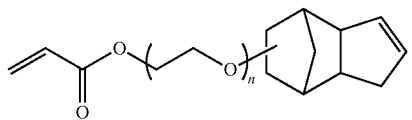
(V-3)

wherein n denotes an integer of 0 or greater.

8. The ink composition according to claim 7, wherein the content of the compounds represented by Formula (V-1) to Formula (V-3) above is 5 to 85 wt % relative to the total weight of the ink composition.

9. The ink composition according to claim 1, wherein it further comprises (C) a sensitizer at 1 to 5 wt % relative to the total weight of the ink composition.

10. The ink composition according to claim 1, wherein it further comprises (D) an amine compound at 1 to 15 wt % relative to the total weight of the ink composition.

11. The ink composition according to claim 1, wherein it comprises an acylphosphine oxide compound as a photopolymerization initiator other than the photopolymerization initiator represented by Formula (II).

12. An inkjet recording method comprising:
(a$^1$) a step of discharging onto a recording medium the ink composition according to claim 1; and
(b$^1$) a step of curing the ink composition by irradiating the discharged ink composition with actinic radiation.

13. The inkjet recording method according to claim 12, wherein the actinic radiation is UV radiated by a UV-generating light-emitting diode.

14. The inkjet recording method according to claim 13, wherein the maximum illumination intensity of the light-emitting diode on the recording medium is 10 to 2,000 mW/cm$^2$.

* * * * *